United States Patent
Schell et al.

(10) Patent No.: US 6,751,735 B1
(45) Date of Patent: Jun. 15, 2004

(54) APPARATUS FOR CONTROL OF CRYPTOGRAPHY IMPLEMENTATIONS IN THIRD PARTY APPLICATIONS

(75) Inventors: Roger R. Schell, Orem, UT (US); Kevin W. Kingdon, San Mateo, CA (US); Thomas A. Berson, Palo Alto, CA (US); Robert R. Jueneman, Provo, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/320,423

(22) Filed: May 26, 1999

Related U.S. Application Data

(60) Provisional application No. 60/079,133, filed on Mar. 23, 1998.

(51) Int. Cl.⁷ .......................... G06F 11/30; G06F 9/44; H04L 9/00
(52) U.S. Cl. ................... 713/189; 713/194; 717/100; 717/162; 717/163; 717/166; 706/47; 706/50; 706/919; 706/921; 706/922; 380/277; 380/286
(58) Field of Search .................. 713/189; 717/100, 717/163, 166; 706/47, 50, 919, 921, 922

(56) References Cited

U.S. PATENT DOCUMENTS

| | | | |
|---|---|---|---|
| 4,870,681 A | 9/1989 | Sedlak | 380/30 |
| 4,918,728 A | 4/1990 | Matyas et al. | 380/21 |
| 4,937,863 A | 6/1990 | Robert et al. | 380/4 |
| 5,007,089 A | 4/1991 | Matyas et al. | 380/49 |
| 5,142,578 A | 8/1992 | Matyas et al. | 380/21 |
| 5,164,988 A | 11/1992 | Matyas et al. | 380/25 |
| 5,200,999 A | 4/1993 | Matyas et al. | 380/25 |
| 5,201,000 A | 4/1993 | Matyas et al. | 380/30 |
| 5,249,230 A | 9/1993 | Mihm, Jr. | 380/23 |
| 5,265,164 A | 11/1993 | Matyas et al. | 380/30 |
| 5,280,529 A | 1/1994 | NØst | 380/49 |
| 5,299,263 A | 3/1994 | Beller et al. | 380/30 |
| 5,337,360 A | 8/1994 | Fischer | 380/23 |

(List continued on next page.)

OTHER PUBLICATIONS

"Mechanics of the Common Security Services Manager (CSSM)", Rajan and Wood, Intel Corporation 1999, pp. 1–17.

"Making PC Interaction Trustworthy for Communications, Commerce and Content", Intel Security Program, Jul. 1998, pp. 1–6.

(List continued on next page.)

*Primary Examiner*—Ly V. Hua
*Assistant Examiner*—Chi-Chung Lee
(74) *Attorney, Agent, or Firm*—Schwegman, Lundberg, Woessner & Kluth, P.A.

(57) ABSTRACT

An apparatus and method provide a controlled, dynamically loaded, modular, cryptographic implementation for integration of flexible policy implementations on policy engines, and the like, into a base executable having at least one slot. The base executable may rely on an integrated loader to control loading and linking of fillers and submodules. A policy module may be included for use in limiting each module's function, access, and potential for modification or substitution. The policy may be implemented organically within a manager layer or may be modularized further in an underlying engine layer as an independent policy, or as a policy created by a policy engine existing in an engine layer. The policy module is subordinate to the manager module in the manager layer in that the manager module calls the policy module when it is needed by the manager module. The policy module is preferably dynamically linkable, providing flexibility, and is layered deeper within the filler module than the manager module.

14 Claims, 9 Drawing Sheets

U.S. PATENT DOCUMENTS

| | | | |
|---|---|---|---|
| 5,386,471 A | 1/1995 | Bianco | 380/49 |
| 5,390,247 A | 2/1995 | Fischer | 380/25 |
| 5,406,628 A | 4/1995 | Beller et al. | 380/30 |
| 5,412,717 A | 5/1995 | Fischer | 380/4 |
| 5,432,849 A | 7/1995 | Johnson et al. | 380/21 |
| 5,495,533 A | 2/1996 | Linehan et al. | 380/21 |
| 5,689,565 A | 11/1997 | Spies et al. | 380/25 |
| 5,721,777 A | 2/1998 | Blaze | 380/4 |
| 5,841,870 A * | 11/1998 | Fieres et al. | 380/25 |
| 5,933,503 A | 8/1999 | Schell et al. | 380/25 |
| 5,935,246 A | 8/1999 | Benson | 713/200 |
| 5,970,145 A | 10/1999 | McManis | 380/23 |
| 6,173,404 B1 | 1/2001 | Colburn et al. | 713/200 |
| 6,330,586 B1 | 12/2001 | Yates et al. | 709/201 |
| 6,335,972 B1 * | 1/2002 | Chandersekaran et al. | 380/286 |
| 6,363,436 B1 * | 3/2002 | Hagy et al. | 709/331 |
| 2002/0073316 A1 | 6/2002 | Collins et al. | 713/174 |

OTHER PUBLICATIONS

"Security Prevails in e–mail coding", pp. 1–2.

"Secure Way Cryptographic Infrastructure", IBM 1996, pp. 1–3.

"Supporting Services and Sub–Systems", IBM 1996, pp. 1–4.

"APIs and Toolkits", IBM 1996, pp. 1–2.

"Cryptographic Engines", IBM 1996, pp. 1–2.

"The IBM Secure Way Cryptographic Infrastructure", IBM 1996, pp. 1–2.

"Applications", IBM 1996, pp. 1–2.

"Conclusion", IBM 1996, pp. 1–3.

"High–Tech Leader Join Forces to Enable International Strong Encryption", IBM 1996, pp. 1–3.

"Gore to Unveil Encryption Policy", The Net 1996, pp. 1–2.

"White House Encryption Initiative–2: IBM, Digital Support", Dow Jones International News, Oct. 1, 1996, pp. 1–3.

"IBM (International Business Machines Corp) to Form Consotium for Data Encryption", Yahoo, Oct. 1, 1996, pp. 1–2.

"Method for Ensuring Integrity of Public Key Algorithm Public and Private Keys and for Coupling the usage of a Key to the Correct Specification of the key's Associated Control Vector", SPI Database of Software Technologies, Jun. 1994, 1 page.

"Solaris Manpage for Intro(1M)(maintenance Commands)", SPI Database of Software Technologies, 1993, pp. 4–7.

"SunOS Manpage for INTRO(4)", SPI Database of Software Technologies, Apr. 29, 1992, pp. 14–15.

"SunOS Manpage for INTRO(8)", SPI Database of Software Technologies, May 22, 1991, pp. 7–11.

Two–Level Data Security System for an IBM Personal Computer; SPI Database of Software Technologies, Mar. 1987, pp. 11–12.

"Statement of the Vice President", The White House, Oct. 1, 1996, pp. 1–3.

"Hardware Contention Serialization Algorithm", *IBM Technical Disclosure Bulletin*, vol. 38, Issue No. 4, Apr. 1995, 73–78.

"Microsoft Computer Dictionary", *5th Edition*, (2002),484.

"Telecommunication Software and Multimedia ISSN", *1455–9749, Article in T–110.501 Seminar on Network Security, 2001ISBN 951–22–5807–2*.

Cheng, et al., "Trusting DRMSoftware", W3C workshop on DRM,Jan. 2001.

* cited by examiner

APPARATUS FOR CONTROL OF CRYPTOGRAPHY IMPLEMENTATIONS IN THIRD PARTY APPLICATIONS

RELATED APPLICATIONS

This application is a Continuation of and claims priority to U.S. patent application Ser. No. 09/274,696, filed Mar. 23, 1999 which is a Continuation-In-Part and claims priority to U.S. Provisional patent application Ser. No. 60/079,133, filed on Mar. 23, 1998.

BACKGROUND

1. The Field of the Invention

The present invention relates to novel systems and methods for controlling access, use, and authorization of encrypting applications hosted on computers. More particularly, the present invention relates to the use of separate modules, located within different access layers, for managing access to cryptography and for container policies in accordance with which access is granted.

2. The Background Art

Encryption is a technology dating from ancient times. In modern times, encryption of military communications has been common. However, since the famous "ENIGMA" machine of World War II, cryptography has been used in numerous functions. One of those functions is special purpose software or applications that may be hosted on computers. Hiding underlying algorithms, limiting access, inhibiting reverse engineering, limiting unauthorized use, controlling licensure, and the like may be legitimate uses of cryptography.

Cryptographic Processes

Modem cryptography protects data transmitted over high-speed electronic lines or stored in computer systems. There are two principal objectives: secrecy, to prevent the unauthorized disclosure of data, and integrity (or authenticity), to prevent the unauthorized modification of data. The process of disguising plaintext data in such a way as to hide its substance is encryption, and the encrypted result is cyphertext. The process of turning cyphertext back into plaintext is decryption.

A cryptographic algorithm, also called a cipher, is the computational function used to perform encryption and/or decryption. Both encryption and decryption are controlled by a cryptographic key or keys. In modern cryptography, all of the security of cryptographic algorithms is based in the key or keys and does not primarily depend on keeping any details of the algorithms secret.

There are two general types of key-based cryptographic algorithms: symmetric and public-key. Symmetric algorithms (also called secret-key algorithms) are algorithms where the encryption key can be calculated from the decryption key and vice versa (and in fact these keys are usually the same). These require that a sender and receiver agree on these keys before they can protect their communications using encryption. The security of these algorithms rests in the key, and divulging the key allows anyone to encrypt and decrypt data or messages with it.

In public-key algorithms (also called asymmetric algorithms), the keys used for encryption and decryption different from each other in such a way that at least one key is computationally infeasible to determine from the other. To ensure secrecy of data or communications, only the decryption key need be kept private, and the encryption key can thus be made public without danger of encrypted data being decipherable by anyone other than the holder of the private decryption key. Conversely, to ensure integrity of data or communications, only the encryption key need be kept private, and a holder of a publicly-exposed decryption key can be assured that any ciphertext that decrypts into meaningful plaintext using this key could only have been encrypted by the holder of the corresponding private key, thus precluding any tampering or corruption of the ciphertext after its encryption.

Most public-key cryptographic algorithms can be used to provide only one of secrecy or integrity but not the other; some algorithms can provide either one but not both. Only the RSA (Rivest, Shamir, and Adleman) public-key algorithm (U.S. Pat. No. 4,405,829), whose security is based on the difficulty of factoring large numbers, has been able to be used to provide both secrecy and integrity.

A private key and a public key may be thought of as functionally reciprocal. Thus, whatever a possessor of one key of a key pair can do, a possessor of the other key of the key pair can undo. The result is that pairwise, secret, protected communication may be available without an exchange of keys. Thus, in general, a receiver, in possession of its own private key may decrypt messages targeted to the receiver and encrypted by the sender using the receiver's public key. A receiver may authenticate the message, using its own copy of a sender's public key, to decrypt data (e.g., a signature) encrypted with a sender's private key corresponding to the sender's public key.

An asymmetric algorithm assumes that public keys are well publicized in an integrity-secure manner. A sender (user of a public key associated with a receiver) can then know that the public key is valid, effective, and untampered with. One way to ensure integrity of data packets is to run data through a cryptographic algorithm. A cryptographic hash algorithm may encrypt and compress selected data. Such hash algorithms are commercially available. For example, the message digest 5 (MD 5), and the message digest 4 (MD 4) are commercially available software packages or applications for such functions.

A certificate may be thought of as a data structure containing information or data representing information, associated with assurance of integrity and/or privacy of encrypted data. A certificate binds an identity of a holder to a public key of that holder, and may be signed by a certifying authority. A signature is sometimes spoken of as binding an identity of a holder to a public key in a certificate. As a practical matter, a certificate may be very valuable in determining some level of confidence in keys associated with encryption. That is, just how "good" is an encryption in terms of privacy and integrity? That confidence level may be established by means of a certificate hierarchy. By certificate hierarchy is meant a certification process or series of processes for providing certificates from a trusted authority to another creator of keys.

A certificate, being a data structure, may contain, for example, data regarding the identity of the entity being certified as the holder of the key associated with the certificate, the key held (typically it is a public key), the identity (typically self-authenticating) of the certifying authority issuing the certificate to the holder, and a digital signature, protecting the integrity of the contents of the certificate. A digital signature may typically be based on the private key of the certifying authority issuing the certificate to the holder. Thus, any entity to whom the certificate is asserted may verify the signature corresponding to the private key of the certifying authority.

In general, a signature of a certifying authority is a digital signature. The digital signature associated with a certificate enables a holder of the certificate, and one to whom the certificate is asserted as authority of the holder, to use the signature of the certifying authority to verify that nothing in the certificate has been modified. This verification is accomplished using the certificate authority's public key. This is a means to verify the integrity and authenticity of the certificate and of the public key in the certificate.

Cryptographic Policies

Government authorities throughout the world have interests in controlling the use of cryptographic algorithms and keys. Many nations have specific policies directed to creation, use, import, and export of cryptographic devices and software. Numerous policies may exist within a single government. Moreover, these policies are undergoing constant change periodically.

Cryptographic policies may limit markets. For example, a cryptographic algorithm may not be included in software shipped to a country having laws restricting its importation. On the other hand, such a cryptographic device may be desired, highly marketable, and demanded by the market in another country. Thus, generalized software development, standardization of software, and the like may become difficult for software vendors. Moreover, users have difficulties attendant with supporting limited installed bases of specialized software. That is, a sufficient installed base is required to assure adequate software.

In short, cryptographic use policies sometimes constrain the set of cryptographic algorithms that may be used in a software system. In addition to restrictions on allowable algorithms, cryptographic use policies may also place constraints on the use and strength of keys associated with those algorithms. Software shipped or used in any country must be in compliance with the policies extant.

Another common aspect of certain cryptographic use policies is a requirement that a copy of cryptographic keys be stored or "escrowed" with an appropriate authority. However, the mechanisms necessary to satisfy different policies can vary greatly.

Cryptography, especially public key cryptography, provides certain benefits to software designers. U.S. Pat. No. 4,200,700, U.S. Pat. No. 4,218,582, and U.S. Pat. No. 4,405,829 are directed to such technology and are incorporated herein by reference. These benefits are available in situations where data may be shared. Many modern software packages (applications, operating systems, executables) are used in businesses or in other networks where multiple "clients" may share a network, data, applications, and the like. Most modem software packages employ cryptography in some form.

One application for cryptography in network management or network operating systems includes authentication. Also, integrity of data packets transferred, encryption of files, encoding associated with licenses for software or servers, and license distribution or serving are some of the applications for cryptography.

Users may be identified and their rights to access may be authenticated by means of passwords on a network. Cryptography is typically used to transfer some authentication, integrity, verification, or the like in a secure manner across a network that may be open to channel tapping. Public key cryptography is typically used in such a circumstance. Another application of cryptography for authentication involves a single sign-on. For example, a user may need to enter a single password at the beginning of a session. This may remain true regardless of the number of servers that may eventually be called into service by the individual user (client) during this single session. Historically, scripts have been used to provide a single sign-on, but public key mechanisms are now being provided for this function.

Users have previously demonstrated that networks may be subject to attack by spoofing of network control packets. This procedure may be demonstrated in playback and in man-in-the-middle scenarios. By such spoofing, users may obtain unauthorized privileges on a network server. Adding packet signatures, keyed on a per-session basis may provide improved packet integrity.

File encryption is becoming more available. Such encryption has particular use in the special circumstance of audit files. For example, a need exists to protect an audit trail from inspection or modification, or both, by a system administrator, even though the audit trail remains under the system administrator's physical control.

Certain licensing schemes may use various encryption modes to protect software against piracy by end users and others throughout a distribution chain. Data structures, cryptography methodologies, checks, and other protection mechanisms may be proprietary to a software developer. Nevertheless, license server mechanisms are being developed to support control of the use of application software in conformity with licenses. Licenses may be provided by an application software provider. The license server may use public key cryptography to create and verify signed data structures. Secret key cryptography may be used to support authentication and file encryption.

Certain applications may provide file confidentiality using proprietary, exportable, secret key algorithms. Users in large numbers make use of such algorithms. Nevertheless, considerable interest in breaking such proprietary algorithms has been successful with certain software. Proprietary encryption methodologies have been consistently broken, given enough time and attention by interested hackers.

Certain applications use public key cryptography for digital signatures. Market leaders in software have provided relatively weak secret key algorithms adopted by others. Thus, files written in different applications from different vendors, even encrypted files, may be opened by an application from any of the vendors using the market leader's secret key algorithm. Within a single product line, a vendor of software applications may use multiple algorithms. Several, if not a plethora of, algorithms exist, including both secret key algorithms and public key algorithms. Stream and block ciphers, as well as hash functions are available and well documented in the computer programming art. Also, certain algorithms are the subject of patent applications which may cloud their broadly based use.

What is needed is a standardized cryptography methodology for distribution across entire product lines. Moreover, encryption technologies are needed for permitting a licensee of a principal software manufacturer to become a third party vendor or value-added distributor capable of producing its own proprietary software, software additions, or pre-planned software modules. Currently, software-with-a-hole may provide an operating system with a cryptographic module that fits in the "hole" in an operating system. However, software manufacturers using this technology typically require that a third-party vendor send its product to the principal software manufacturer for integration. The manufacturer may then provide all interfacing and wrapping of the third-party's filler (such as an encryption engine) to fit within the "hole" in the software of the manufacturer.

Also, export restrictions exist for encryption technology. Limiting the strength of exported cryptography is established by statute. To be exportable, such products must meet certain criteria (primarily limitations on key size) that effectively prevent the exportation of strong cryptographic mechanisms usable for data confidentiality. Moreover creating "cryptography with a hole" is undesirable for several reasons, including export and import restrictions. Cryptography with a hole is the presence of components specifically designed or modified to allow introduction of arbitrary cryptographic mechanisms by end users. A great escalation of the difficulty of such introduction, without creating numerous, individually customized software packages, is a major need today, although not necessarily well-recognized.

Certain foreign countries have more stringent regulation of the importation of encryption technology by non-government entities. A government may require that any imported encryption technology be subject to certain governmental policies as well as key escrow by some governmental agency. Key escrow systems may be easily provided in software, but integrity and assurance remain difficult. Using only software, reliable key escrow may be impossible, in the absence of very high assurance. For example, Class B3 or A1 may be required of a "trusted computing base" in order to protect keys against disclosure or modification. Likewise, protection of algorithms against disclosure or modification, and escrow against bypass, are also often required. Under any circumstances, software offers few protections when compared with hardware solutions.

Customers, whether third-party vendors, distributors, or end users, need information security. International commercial markets need products that may be marketed internationally without a host of special revisions that must be tracked, updated, and maintained with forward and backward compatibility as to upgrades and the like. Meanwhile, such solutions as key escrow do not receive ready customer acceptance in U.S. markets, particularly where a government is an escrow agent.

Flexibility of encryption technologies is also important, particularly to software development. For instance, it is important that standards or properties be created for managing access to encryption technologies. At the same time, it is likely that the properties will change over time, and the properties should be easily modified. The properties should also be securely contained with specific applications implementing the encryption technologies.

Therefore, what is needed is a cryptography apparatus and method that may be mass produced in a variety of products across an entire product line. A technology, or product that can be sold in identical form both domestically and abroad is highly desirable. An encryption method and apparatus are needed that may provide improved methods for security and integrity of data provided by cryptographic algorithms and keys themselves, without requiring "trust" between sender and receiver.

Also needed is a key escrow mechanism for corporate environments. For example, file encryption by an employee will usually be required to be subject to an escrow key in the possession of the employer. Also, in conjunction with signature authorities, delegation of such authority may be useful in a corporate environment. Nevertheless, each corporate user may be viewed as a secondary (vendor) level desiring to have its own encryption and escrow control of all copies of all keys.

What is needed is a method for producing cryptographic applications that may be customized individually, from individual modules. That is, what is needed is modules that may be used to limit the capabilities of cryptographic applications without proliferating individual customized software products that may become very difficult to maintain, upgrade, support, and the like. What is needed is an apparatus and method that can separate a cryptography application or a cryptography filler for an operating system "slot" into modules. Modules need to be configured to minimize the extent of interfaces and the amount of code that must be interfaced. Modules should minimize the number of exclusions from a system that must be patched or replaced in order to enable the software system to satisfy relevant cryptography usage policies.

Such a system is also needed in which a cryptography filler can be provided with separate access manager and access properties modules. Such property modules should be securely loaded within deeper, less accessible layers than the manager modules and should be subordinate to one manager module, responding when called by one manager modules.

What is needed also are an apparatus and method effective to enable a manufacturer of a cryptographic engine to produce a single implementation of a modular package embodying particular cryptographic algorithms. The manufacturer should remain able to include that implementation in all versions of a software product. This should be true regardless of different key usage policies mandated by various regulatory authorities. It should be true regardless of a requirement for disabling of certain of the included algorithms.

Also needed is an alternative to prior art systems that require both a "policy" and an algorithm implementation to be supplied (even lastly shipped) from the manufacturer of a cryptography engine as the wrapping and certifying entity. Instead, what is needed is an apparatus having an architecture and implementation by which a manufacturer of a cryptographic engine need not be the same entity as a supplier/generator of a policy (e.g. government) to which the cryptographic engine's algorithms are constrained to conform.

Beneficial, and therefore desirable or needed, is an apparatus and method having distinct executable modules and policy data structures sufficiently separable to reduce the cost of customizing an entire software system. Thus, a system is needed that is adaptable to inexpensive customization without implementing an embedded policy.

Also needed is an apparatus and method for separating a policy from an algorithm to enable flexibility in the management and delivery of cryptographic capabilities in conformance with the local regulations. For example, some method is needed by which a manufacturer can produce a cryptographic engine, but exclude a policy certificate permitting use of the algorithms implemented by that engine. That is, a method is needed by which a manufacturer or one or more other policy certificate authorities may separately offer key and policy authorization, certification, and verification conforming to local regulations.

BRIEF SUMMARY AND OBJECTS OF THE INVENTION

In view of the foregoing, it is a primary object of the present invention to provide an apparatus and method comprising distinct, controlled modular cryptography modules and policy data structures.

It is another object of the invention to provide such an apparatus and method whereby separate manager and subordinate policy modules are dynamically loaded of modules into a base executable in a manner to prevent substitution, modification, extension, or misuse of algorithms implementable by the modules.

It is another object of the invention to provide such separate manager and subordinate policy modules whereby different policies may be implemented by modifying the policy modules without modifying the manager modules and whereby the modified policy modules may be independently indicated as coming from an intended vendor.

Consistent with the foregoing objects, and in accordance with the invention as embodied and broadly described herein, an apparatus and method are disclosed in certain embodiments of the present invention as including a controlled modular cryptography system.

A principle feature provided by an apparatus and method in accordance with the invention includes limitation of software integration. For example, a software integration limiter may provide a cryptographic operating system with a "slot." That is, an operating system may be thought of as a block of executable instructions storable in a memory device, and loadable on a processor.

A software integration limiter in accordance with the invention may provide an architecture and coding to limit the integration of coding required to fill a "slot" left within an operating system. Thus, the operating system or other software cannot operate at all, or may be configured to not operate with cryptographic capability, absent an authorized, added software "filler" filling the "slot".

Another feature available in an apparatus and method in accordance with the invention may be a vendor-constrained, remotely sealed, software integration limiter. For example, prior art systems may require that a manufacturer receive, license for import, and wrap the code of value-added resellers and vendors, incorporating the codes into a cryptographically enabled software product.

By contrast, an apparatus and method in accordance with the invention may provide for a universal "base executable" comprising a software system for operating on a computer. A software development kit may be provided with certain authorizations to an agent, vendor, distributor, or partner. The authorizations may be provided as certificates permitting the agent to create software modules and wrap them without their contents being known, even to the original manufacturer of the "base executable" or the software development kit. Such a system may then include a constrained policy obtained by the agent, vendor, etc., in cooperation with a government, to meet the import laws of the country of sale of the entire package, the software "base executable," modules from vendors, and an authorizing policy. Such a system may allow an agent (development partner, third party value-added seller, module vendor, distributor) to provide sealed encryption algorithms. The algorithms may remain known only to the agent, (partner, distributor, etc.) although accessed for linking using keys authorized by the manufacturer of the base executable.

The software development kit may provide for an authorization mechanism, such as a certificate of authority immediately identified with the software development kit and the agent. Any "base executable" may then verify any module from any vendor to determine that the vendor has produced a module in accordance with policy constraints imposed on the software development kit and verified by the "base executable" produced by the manufacturer.

Thus, a universal "base executable" may be exportable by a manufacturer and importable by a distributor or reseller. A distributor may be responsible to obtain the proper licensure for cryptographic equipment and functionality. The "base executable" can verify that all modules by a distributor come from a software development kit operating within its bounds of policy authorization and other permitting functionality.

In short, the "base executable" knows how to recognize a valid signature provided from a module created on a proper software development kit. A software development kit may produce or generate proper digital signatures. The agent's, distributor's, or partner's module product may then carry the proper signature. Therefore, the "base executable" may recognize and run only those modules having valid signatures corresponding to software development kit "toolboxes" of known, authorized agents or distributors, and in accordance with authorized policies.

Another feature of an apparatus and method in accordance with the invention may be a null engine. A null engine may be provided by a manufacturer with any "base executable" (principal software product, operating system), having no enabled cryptographic capability. Nevertheless, the null engine may support all interfaces required by a "slot" in the base executable, and all functionalities except cryptographic capabilities required by a "filler." Thus, for example, an operable software system may be delivered having no cryptographic capability, simply by providing a filler including a null engine to fill the "slot" within the software product (operating system, base executable) provided by the manufacturer.

Another feature of the apparatus and method in accordance with the invention may be flexible key escrow capability. This feature may be thought of as a modular key escrow method. Escrow capability may escalate from a self escrow. For example, an individual company, individual user, or the like, may hold and control all keys. At an opposite extreme, an escrow of a key may reside with some other independently authorized escrow agent. A key escrow may reside with a governmental agency itself as required in some countries.

Another feature of an apparatus and method in accordance with the invention may include cryptographic wrapping of keys. That is, wrapping may be thought of as tamper proofing (authentication) and encrypting (secrecy protection) a key. Prior art system's keys may be simply bit strings of sufficient length and complexity to reduce the probability of their being deciphered.

Here, a holder's identification and a certification authority's identification may be applied to a key itself. The digital signature of the certifying authority may enable verification of such certification. The keys may be centrally managed, such as by a management module in the "base executable" from a manufacturer. Such a module can therefore restrict creation, distribution, and use of keys, especially within a network or internetwork.

Another feature of an apparatus and method in accordance with the invention may include quality-graded certificates. The certificates may be generated by distributors (value-added resellers, module vendors, agents, partners). However, the certificates may provide a "pedigree" indicating an integrity level of the cryptography provided by a certificated software product. Thus, a purchaser of software who will become a user or owner (holder) may know the cryptographic strength (algorithm, key length) or quality (integrity; value limit of assurance) of the systems used or created, with a verification that cannot be forged.

Another feature of an apparatus and method in accordance with the invention may be provision of cryptographic engines that are not independently usable. For example, cryptographic engines may be comprised of, or included with, wrapped, non-linkable modules that can only be used in a filler to fill a "slot" in a base executable (principal software application) from a specified manufacturer. Thus, unlike the prior art where a cryptographic engine obtained by a vendor or third party may be used with any software, cryptographic engines made in accordance with the invention may not be enabled absent verification of their integrity, applicability, policy, or the like by a base executable (principal software product). For example, a base executable, such as an operating system or other manufacturer-supplied module may verify any and all modules attempting to link with the base executable and vice versa.

Another feature of an apparatus and method in accordance with the invention may be constraining the linking of modules to a specific class of module, or within a specific class of module, through the use of cryptography. Thus, for example, a hierarchy of linking may be created within individual software modules, so that all modules may link only to peers (associated modules in one filler) and may not necessarily be able to link directly with selected modules of the total group of peer modules with the same filler. For example, an application or library module may not bypass an access limiting manager module to interface with a cryptographic engine module.

Another feature of an apparatus and method in accordance with the invention is that modules such as the access limiting manager modules may rely upon other modules such as the policies of modules, which may be located at a lower hierarchal linking layer than the manager module. The manager module and the policies modules may be independently dynamically linked. Accordingly, the policies module may be modified, and the modifications can then be authenticated as coming from a project vendor by the base executable.

Thus, the above objects may be met by one or more embodiments of an apparatus and method in accordance with the invention. Likewise, one or more embodiments of an apparatus and method in accordance with the invention may provide the desirable features as described.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
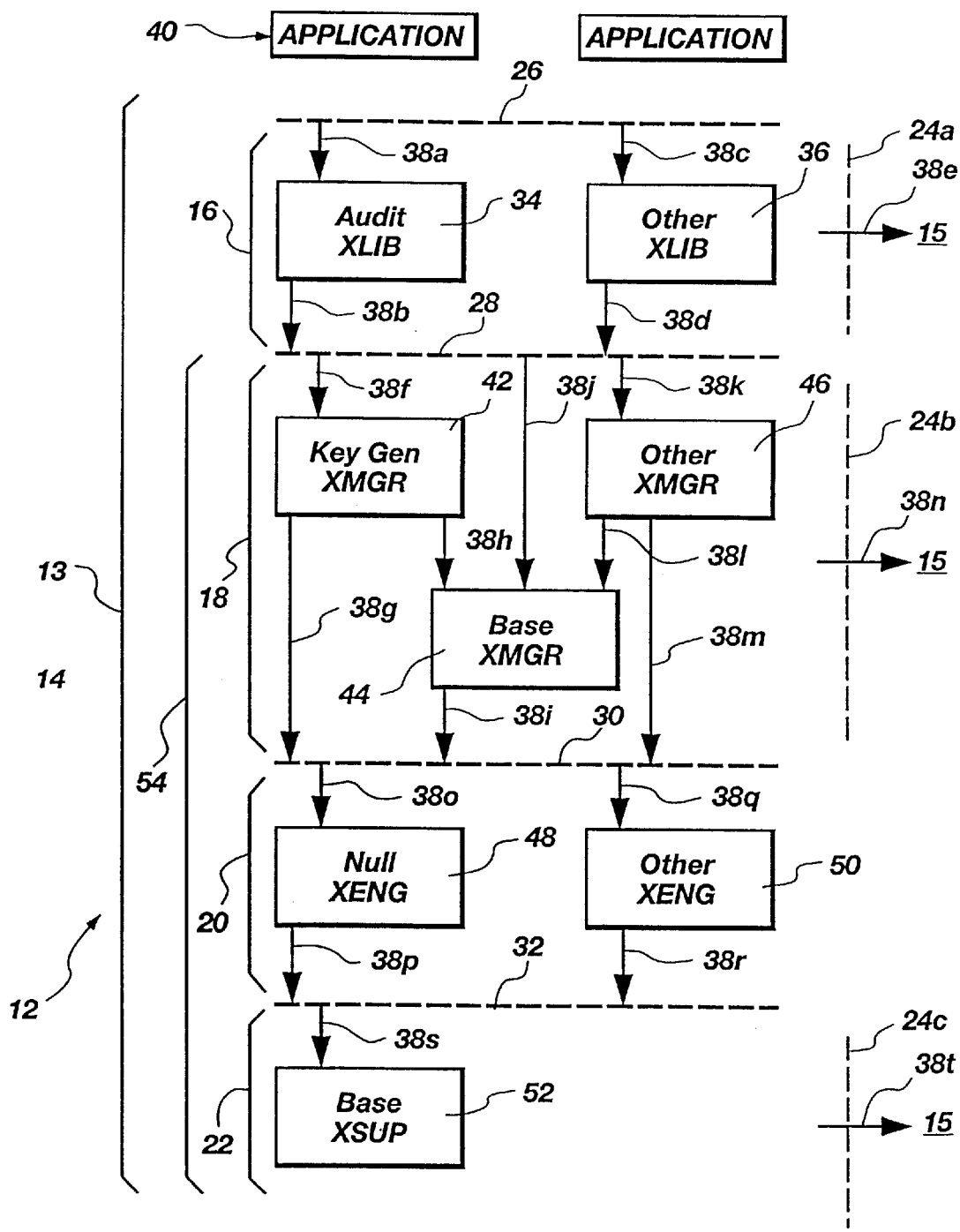
FIG. 1 is a schematic block diagram of modules arranged in one embodiment of an architecture for an apparatus and method in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout.

Reference numerals having trailing letters may be used to represent specific individual items (e.g. instantiations) of a generic item associated with the reference numeral. Thus, a number 156a, for example, may be the same generic item as number 156f, but may result from a different version, instantiation, or the like. Any or all such items may be referred to by the reference numeral 156.

Figure 2:
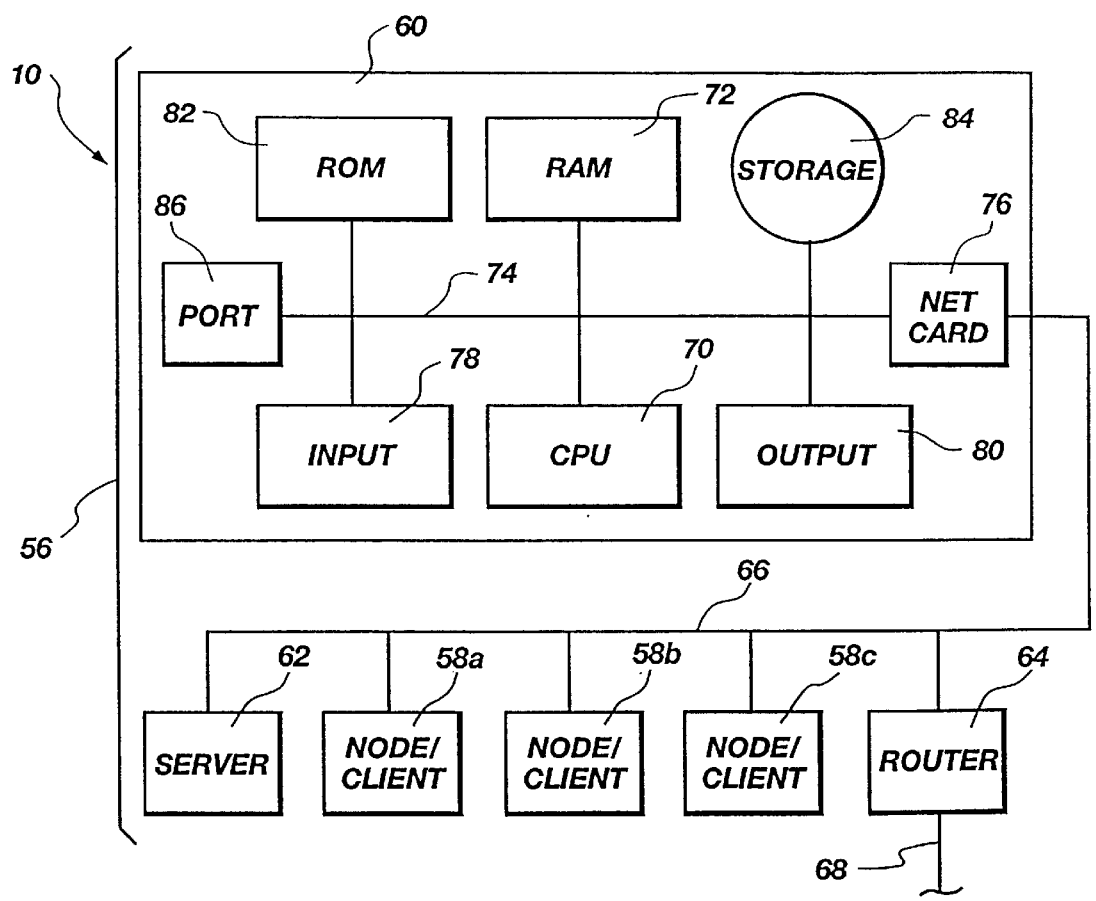
FIG. 2 is a schematic block diagram of an apparatus in a network for hosting and implementing the embodiment of FIG. 1.
Figure 3:
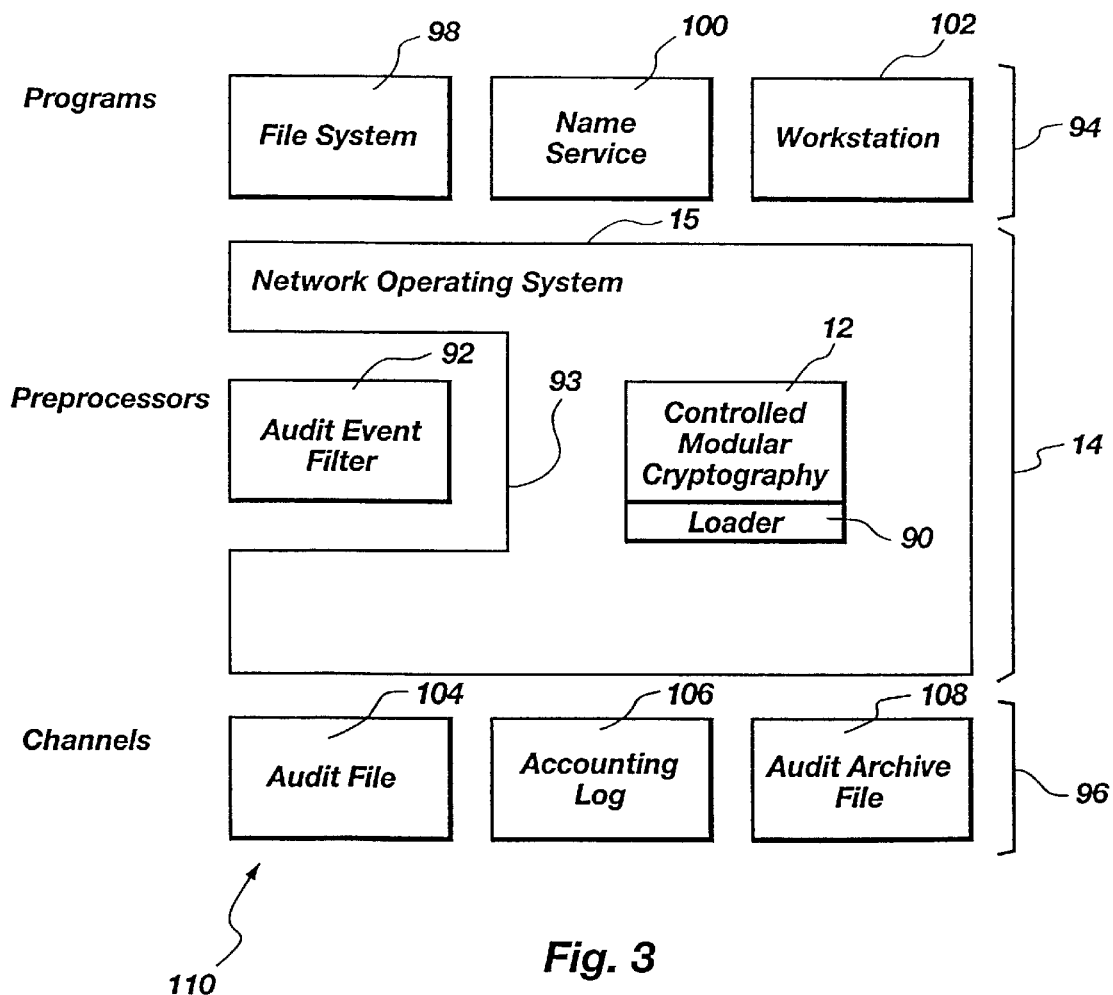
FIG. 3 is a schematic block diagram of an example of executables operable in a processor for implementing the embodiment of the invention illustrated in FIG. 1.
Figure 4:
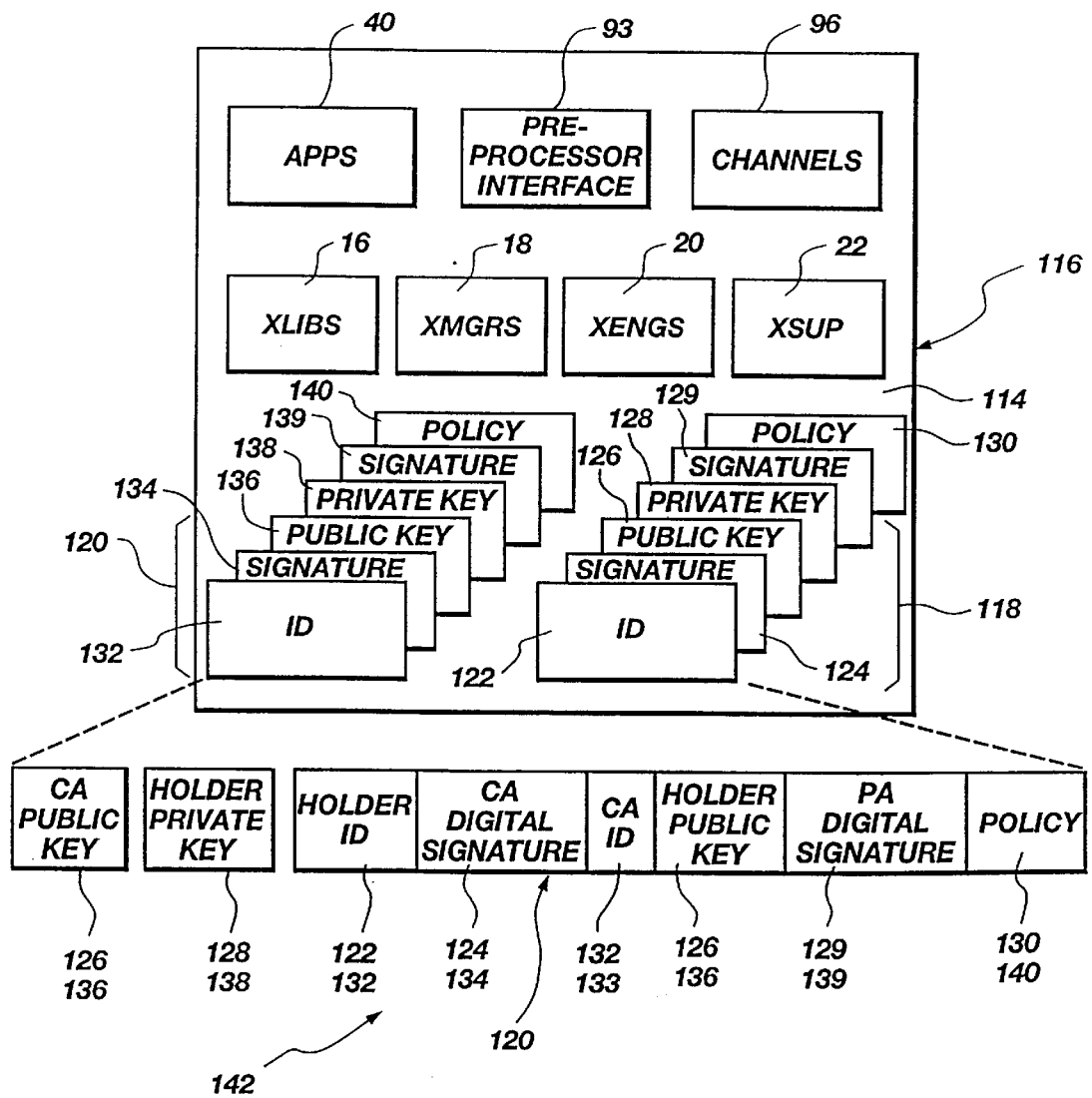
FIG. 4 is a schematic block diagram illustrating examples of data structures in a memory device corresponding to the apparatus of FIGS. 1–3.
Figure 5:
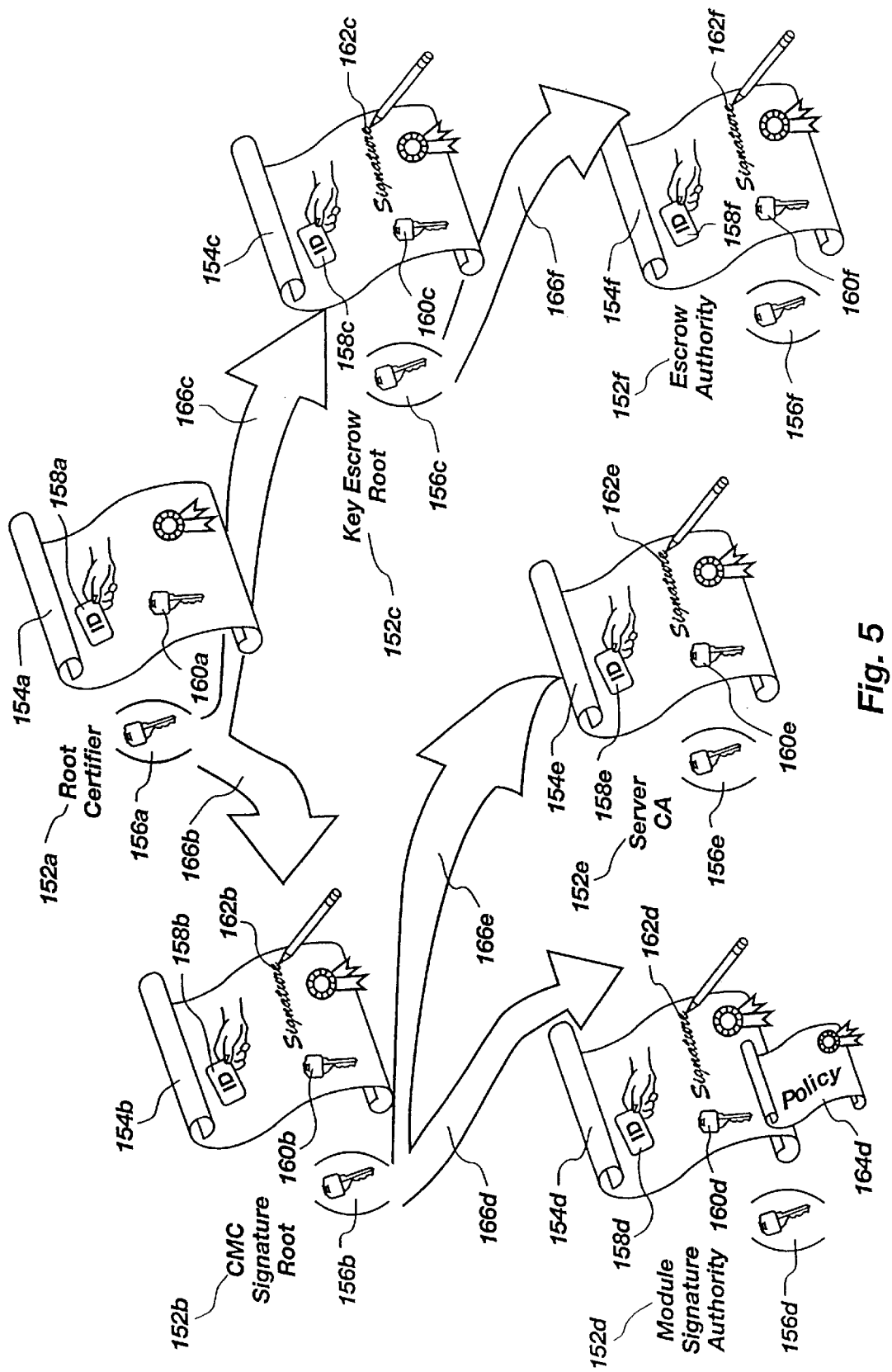
FIG. 5 is a schematic block diagram illustrating certificate hierarchies for implementing one embodiment of an apparatus and method in accordance with the invention.
Figure 6:
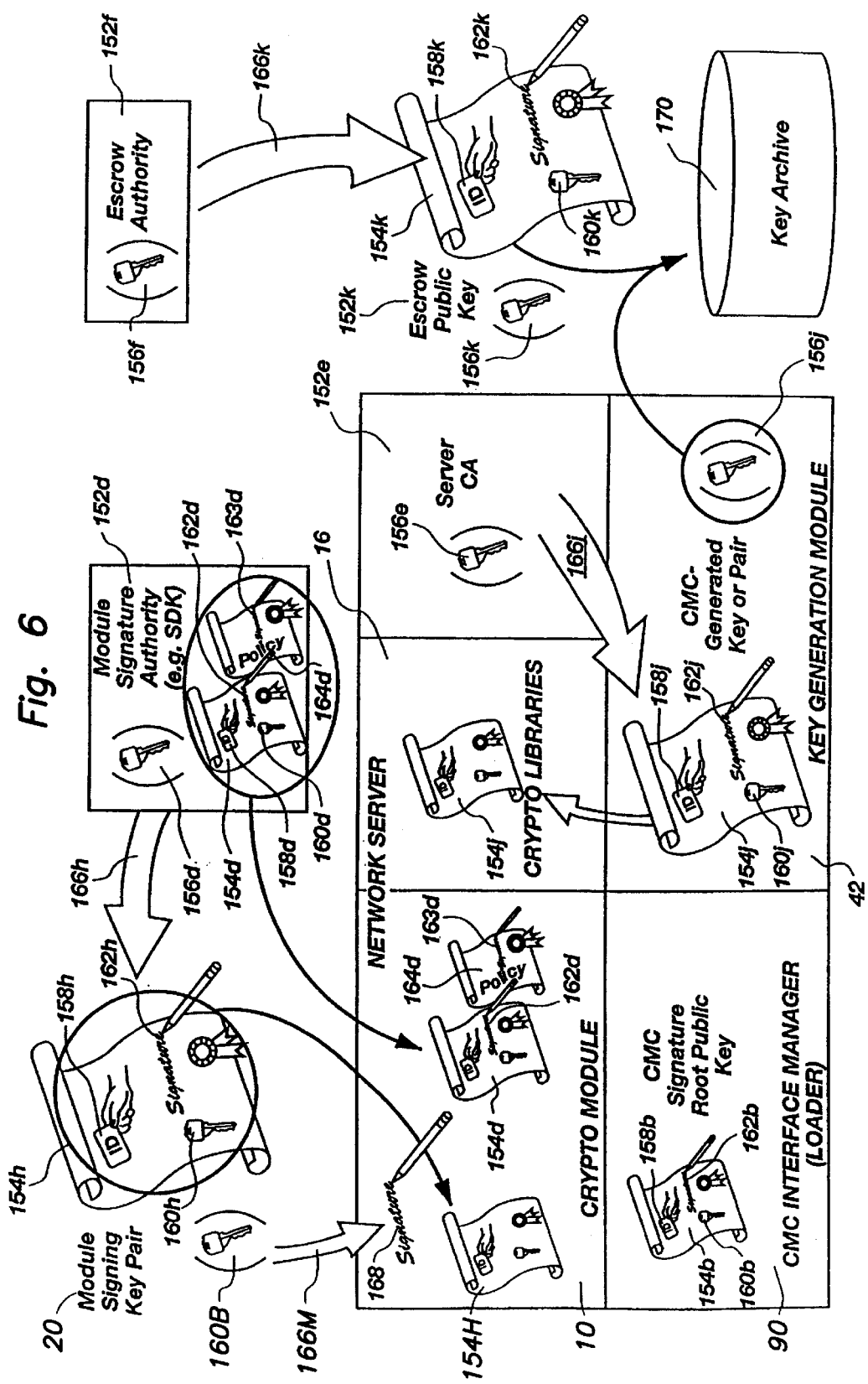
FIG. 6 is a schematic block diagram of certain operational processes for one embodiment of a controlled modular cryptography system implemented in accordance with the invention.

Referring to FIGS. 1–3, a method and apparatus for providing controlled modular cryptography is illustrated in software modules, supporting hardware, and as executables distributed through a processor. Reference is next made to FIGS. 4–6, which illustrate in more detail, schematic block diagrams of certain preferred embodiments of an apparatus and method for implementing controlled modular cryptography in accordance with the invention. Those of ordinary skill in the art will, of course, appreciate that various modifications to the detailed schematic diagram of FIGS. 1–6 may easily be made without departing from the essential characteristics of the invention as described. Thus, the following description of the detailed schematic diagrams of FIGS. 1–6 is intended only as an example, and it simply illustrates certain presently preferred embodiments of an apparatus and method consistent with the invention as claimed herein.

Referring now to FIGS. 1–6, a controlled modular cryptography (CMC) process 12 or method 12 may be implemented using a plurality of modules 13. The CMC process 12, alternately referred to herein as CMC 12, may be embedded within another executable 14 such as a network operating system 14. The network operating system 14 may include an operating system proper 15, what would conventionally be known in a generic operating system as the operating system 15.

The network operating system 14 may also have provision for insertion of a pre-processor 92 in a conventional hole 93.

By contrast, the CMC 12 is not accessible by third parties at a pre-processor slot 93. Third parties may create pre-processors 92 having direct access to the operating system 15. Prior art cryptographic engines are often mere pre-processors interposed between applications 40 and the operating system 15. Likewise, the unauthorized installation by a third party of a cryptographic engine in a pre-processor slot 93 may be rendered virtually impossible by the CMC 12 and operating system 15. Instead, the CMC 12 may be loaded into the base executable 14 such as the network operation system 14 in a manner that embeds the CMC 12 into the operating system 14 and prevents interfacing by any third party to the cryptographic capability of the CMC 12. (See FIG. 3)

Referring now to FIGS. 1–6, and more particularly to FIG. 1, the controlled modular cryptography 12 may include library modules 16 for interfacing with applications 40. Each library module 16 (X library 16, or simply library 16) may be application-specific.

The loader 90 (see FIG. 3) provides layering (hierarchical linking) or nesting (recursive loading or linking) of interfaces. The layering may effectively prevent applications 40 on an operating system proper 15, for example, from interfacing directly with controlling modules 13 (e.g. manager modules 18) or with engines 20 (e.g. cryptographic engine 50). The loader 90 may do this directly by dynamic loading of modules 13, enforcing restrictions on access to interfaces between levels 16, 18, 20, 22, 15 illustrated in FIG. 1.

Manager modules 18 as well as the original loader 90 loading a filler 12 (CMC 12) may assure that a layering hierarchy is enforced between modules to limit interfaces. Manager modules 18 may interface with library modules 16. The manager modules 18 may also interface with the cryptographic engines 20, or engine modules 20. Support modules 22 may interface with engine modules 20 also.

Library modules 16, manager modules 18, and support modules 22 may interface with the operating system 15 in one preferred embodiment of an apparatus and method in accordance with the invention. The engines 20 may be enabled to interface only with other modules 13, and not with the operating system 15.

By the subdivision of modules 13 in a layered architecture (e.g. layer 18 is manager modules 18 including modules 42, 44, 46), great flexibility may be obtained. Since modules 13 are dynamically bound by the loader 90, and managed by a manager module 18, the modules 13 may be modified or exchanged as needed and as authorized. Management modules 18 not yet envisioned may be added in the future, without revising the base executable 14, or even the filler 12, outside the module 13 in question.

For example, a management module 18 may support cryptographic-token PIN (personal identification number) management, not available in an initially purchased product 14. Another example may be added support for policy management enhancements, such as providing separate APIs (application programming interfaces) for encrypting and decrypting ubiquitous financial data used by banks.

New functionality, not typically used or required in current practice by banks, may include a separate key type or size specifically for financial data. Such keys 156, 160 may be relatively stronger than general keys 156, 160, while use, holders, data types, and the like may be restricted by policies 164 crafted for special financial purposes. Thus financial keys 156, 160 may be managed differently from other general types of keys 156, 160.

Referring now to FIG. 2, a network 56 may comprise a plurality of nodes 58 (e.g. clients 58). Although the clients 58a, 58b, 58c are illustrated, the computers of the clients 58, server 62, and router 64 may also be thought of as being hosted, programmed to run on, any computer 58, 60, 62, 64 on a network 56. Likewise, the CMC 12 may be programmed into any of those computers 58, 60, 62, 64. By node is meant a computer on a network 56 in its broadest sense.

Likewise, the host 60 or server 60 may actually be programmed to function as one of several servers 62 or routers 64. As a practical matter, the server 62 may be replaced by the server 60. A node 58 may include some or all of the structural contents illustrated for the server 60. For example, if every node 58 comprises a computer, every node 58 may have any or all of the components 70–86.

A network 56 may include a backbone 66 for interconnecting all the nodes 58 or clients 58. The router 64 may also connect to one or more other networks 68. The network 68 may be a local area network (LAN), wide area network (WAN) or any size of internetwork.

The server 60 may include a CPU 70 or processor 70 for hosting the operating system 14 and CMC 12. As a practical matter, a random access memory 72, or RAM 72, may temporarily store, in part or in total, any or all codes and data associated with executables within the CMC 12. For example, during operation of the CMC 12, individual modules 13 might be stored, or a portion thereof might be stored in the RAM 72.

The CPU 70 and RAM 72 may be connected by a bus 74. Also on the bus may be operably connected a network card 76 or network interface circuit 76 (net card 76), one or more input devices 78, and output devices 80, or the like. Additional memory devices such as a read-only memory 82 (ROM 82) and a storage device 84 (such as a hard disk 84), may be operably connected to the bus 74 to communicate data with the processor 70.

Additional ports 86 may be provided as appropriate. As a practical matter, the input device 78 and output device 80 may merely represent ports for accessing one or more available input or output devices 78, 80. Similarly, with the distributed nature of hardware and software in a modern computing environment, other devices may be accessed, through the net card 76, elsewhere on the network 56.

Referring to FIG. 1 once more, the interfacing between modules 13 may be restricted. Such a restriction may provide additional assurance that the CMC 12 may not be misused, modified, or replaced improperly. Therefore, certain of the modules 13 may have operating system interfaces 24. For example, the interfaces 24a, 24b, 24c represent the interfaces between the libraries 16, managers 18, base 22, respectively, shared with the operating system 15.

In the illustrated embodiment of FIG. 1, the engines 20 share no interface with the operating system 15. Instead, the engines 20 may interface through the base support 22. Library interface 26 represents the interface between library 16 and applications 40. The library interface 26 may be considered to be an interface between the CMC 12 and applications 40.

The libraries 16 may be structured to interface directly with applications 40. The foundation 54 or the CMC foundation 54 may be thought of as the core of the CMC 12. The managers 18 provide cryptographic facility as well as controlling access to and between modules 13, especially in the core 12. The interface between the CMC enforcement by the foundation 54 and applications outside the base executable 14 is moved away from the manager interface 28 by the library interface 26 and interposed libraries 16. Thus, applications 40 are not permitted to interface directly with the (controlling) management modules 18. This further avoids creation of cryptography with a hole.

The manager interface 28 represents the interface between the manager modules 18 and the library modules 16. The engine interface 30 represents the interface between engines 20 and the manager modules 18. The support interface 32 represents the interface between the engines 20 and the support modules 22.

In general, communications 38 may be calls from upper layers 40, 16, 18, 20 to lower layers 16, 18, 20, 22, respectively, in FIG. 1. Each layer 18, 20, 22 may properly execute without requiring anything from a layer 16, 18, 20, respectively, above.

In one embodiment of an apparatus and method in accordance with the invention, one library 16 may be an audit library 34. For example, the audit library 34 may have functional responsibility for encrypting security audit data for storage. The underlying data may correspond to events of significance to audit executables. The network 56 itself may be managed by an individual acting as a system manager, yet the audit data encrypted by the audit library 34 may be inaccessible to the system manager.

Other libraries 36 may be provided. Each of the libraries 36 may be application-specific. In one presently preferred embodiment, each of the applications 40 interfacing at the library interface 26 may have an associated, unique, library module 36 provided.

The key generation manager 42 may create symmetric keys or asymmetric key pairs provided to cryptographic engines 20. The key generation manager 42 may also perform the escrow function of the escrow archive 170 (see FIG. 6). A base manager 44 may provide enforcement of policies 164.

Restriction on access to modules 13, such as the engines 20, and access to cryptographic algorithms within engine modules 20, and the like, may be enforced by the manager modules 18. In one embodiment of an apparatus and method in accordance with the invention, the base manager 44 may provide an enforcement function with respect to all functions and all modules 13. Other managers 46 may also be provided. For example, manager modules 46 may alter methods of policy enforcement for the escrow of keys 156.

In one embodiment, the CMC 12 may be provided with a null engine 48. A null engine 48 may be operated to interface at the engine interface 30 and the support interface 32 while providing no enablement of cryptographic capability. Thus a base executable 14 may be fully functional otherwise, including all necessary interfaces to the filler 12 (CMC 12), while having no enabled cryptographic capability. The interfaces 26, 24 to the filler 12 may be as secure as if the dynamically loaded modules were manufactured as integrated portions of the base executable 14.

Thus, an apparatus 10 may be provided as a base executable 14, having fully imbedded support for a cryptographic engine 20. However, the presence of a null engine 48 accommodates all the proper interfaces 30, 32 while actually providing no cryptographic capability.

Thus, a CMC 12 (filler 12) may be provided with a base executable 14, including a null engine 48, exhibiting minimal differences with respect to the operating system 15 as compared to another cryptographically-enabled product. Meanwhile, other engines 50 may be provided by a manufacturer or a third party vendor authorized to create cryptographic engines 20 according to some policy and authorization.

A base support module 52 may provide some minimal set of operating system instructions for the engines 20. That is, in general, the engines 20 need some access to the operating system. Nevertheless, for providing the assurance that engines 20 may not be created, modified, extended, circumvented, inserted, or the like, in an unauthorized fashion, the support module 52 may intervene. Thus, the base module 52 may provide access to some limited number of functions from the operating system 15 for the engine 20.

Referring now to FIG. 3, an operating system 14 may be implemented in one embodiment of an apparatus and method in accordance with the invention to include a loader 90. The loader 90 may be associated with the operating system proper 15. The functional responsibility of the loader 90 may be to dynamically load and properly link all modules 13 into the CMC 12 (filler 12), for example, installing (e.g. embedding) them into the operating system 14.

More specifically, the loader 90 may be tasked with the functional responsibility to provide all proper linking between modules 13. Linking may be enabled on a layer-to-layer (or interface 28, 30, 32) basis rather than on a module-by-module basis. For example, a binding may exist between any two modules 13 in a layer (e.g. layer 18, or layer of manager modules 18). Binding may also exist between any module (e.g. modules 42, 44, 46) in that layer (e.g. layer of managers 18) and another module (e.g. modules 48, 50) in a layer (e.g. layer 20, or layer of engines 20) sharing an interface (e.g. interface 30) with that layer (e.g. layer 18).

Specific modules 13 need not be individually limited and controlled by the loader 90. In one embodiment, individual modules 13 may be bound (linked). Thus, for example, only those functional features authorized for a key generation manager 42, or a cryptographic engine 50, might be enabled by being properly bound.

In one example, a cryptographic engine 50 may be manufactured to contain numerous algorithms. However, according to some policy 164 (see e.g. FIGS. 5, 6) associated with a certificate 154, a manager 46 and the loader 90 may limit linking (binding) to an enablement of algorithms and engines 20. A manager module 46 may also control key usage, including length and function. Function may be distinguished between, for example, encryption versus authentication. Use may be controlled based upon, for example, a manufacturer's (of the module 13) signature 162 and key type.

The operating system 15 may support a selection of pre-processors 92 such as the audit event filter 92. Pre-processors may be adaptable to fit in a hole 93 readily available for the purpose. In one currently preferred embodiment of an apparatus and method in accordance with the invention, a CMC 12 is not adaptable to be implemented as a pre-processor 92. Instead, the CMC 12 may be limited to interfacing only with the operating system proper 15 as illustrated in FIG. 1, and only after proper loading by a loader 90. Even within the operating system 15, the CMC 12 may be limited to interfacing with the operating system 15 through a limited number of interfaces 24.

As a practical matter, certain applications 94 or programs 94 have resident portions within the server 60 hosting the operating system 14. For example, a file system 98, a name service 100, a work station 102 and the like may have resident portions operating in the processor 70. Even if, for example, a server 62 is operating as a file server, the file system 98 may be a portion of a file server executable that needs to be resident within the processor 70 of the server 60 in order for the server 60 to communicate with the server 62 over the network 66.

Generally, certain data may need to flow into and out of the operating system 14. Accordingly, a number of channels 96 or data flow paths 96 may need to exist. As a practical matter, the channels 96 may be comprised of either paths, data itself, or as executables hosted on the processor 70 for the purpose of providing communication. Thus, an audit file 104, an accounting log 106, an archive file 108, and the like may be provided as channels 96 for communication.

Thus, the overall operating system 14 along with the applications 94 and channels 96 may be thought of as a local system 110 or the local processes 110. These local processes 110 operate within the CPU 70. The CPU 70 is a processor within the server 60 or host 60. As a practical matter, the processor 70 may be more than a single processor 70. The processor 70 may also be a single processor operating multiple threads under some multitasking operating system 15.

Data representing executables or information may be stored in a memory device 72, 82, 84. Referring now to FIG. 4, one may think of a dynamic data structure 114 or an operating system data structure 114 storable in an operable memory 116. That is, for example, the operating memory 116 may be within the RAM 72 of the host 60. All or part of the data structure 114 may be moved in and out of the processor 70 for support of execution of executables.

The data structure 114, may be dynamic. The modules 13 for example, may be dynamically loadable, such as network loadable modules. Thus, for example, a host 60 may operate without having any fixed, storable, data structure 114. That is, no static data structure need be assembled and stored in a manner that may make it vulnerable to being copied or otherwise inappropriately accessed. The data structure 114 may only exist dynamically during operation of the processor 70, and even then need not all exist in the memory device 116 (e.g. RAM 72) simultaneously at any time. Thus, additional assurance is provided against misuse, and abuse of data and executables in a CMC 12 associated with an operating system 14.

The data structure 114 may contain a certificate 118 and certificate 120. A certificate 118, for the purposes of FIG. 4, may be thought of as an instantiation of a certificate 154 associated with the operating system 14 and its included CMC 12. The certificate 118 may be thought of as the data certifying the holder of a certificate operating and using the data structure 116. By certificate 120 is meant data provided in a certificate issued to the holder.

A certificate 118, 120 may also be thought of as a binding of a holder ID 122, 132 to a public key 126, 136, certified by a digital signature 124, 134 of a certifying authority. An issuer (e.g. 152b) or authority and a holder (e.g. 152d) may each be a holder (e.g. 152b) to a higher authority (e.g. 152a), and issuer (e.g. 152d) to a lower holder (e.g. 152h of FIG. 6), respectively.

When discussing authorities, holders, receivers, and the like, it is important to realize that such an authority, holder, sender, receiver, or the like may actually be a hardware device, or a software operation being executed by a hardware device. Any hardware device, operating software, or data structure in a memory device may be owned, controlled, operated, or otherwise associated with an individual or an entity. Nevertheless, insofar as the invention is concerned, names of such entities may be used to represent the hardware, software, data structures, and the like controlled or otherwise associated with such entities.

As a practical matter, a certificate 118 authenticating the rights of the CMC 12 may contain an identification record 122 identifying the holder (the specific instance of the CMC 12), a signature record 124 verifying the higher certification authority upon which the holder depends, and a public key record 126 representing the public key of the holder. The private key 128 may be very carefully controlled within the CMC foundation 54 using encryption for wrapping. The private key 128 may be associated with the holder (CMC 12) and is the private half 128 of a key pair including the public key 126. Thus, by means of the private key 128, the holder may create the signature 134 in the certificate 120 for another use of the key pair 136, 138.

Meanwhile, a certification authority 152 (see FIGS. 5–6) may provide to a holder or sign 166, the certificate 118 (one of the certificates 154). The certificate 120 may reside in another computer or simply be allocated to a different thread or process than that of the certificate 118.

As a practical matter, a private key 128, 138 may be protected by physical security. Therefore, a private key 128, 138 may typically be controlled and be cryptographically wrapped except when dynamically loaded into a dynamic data structure 114.

The private key 128 may be used to certify an identification record 132 identifying a new holder. A signature 134 created by use of the private key 128 may verify the authenticity and quality of the certificate 120 and public key 136. The public key 136 may be thought of as the matching key 136 to a key pair including the private key 138 created by the new holder of the certificate 120. That is, one may think of a new holder, as a process, or an individual, issuing a public key 136 certified by the signature 134 of the private key 128 as duly authorized to create software which functions within the limits of a policy 140. The certificate 118, an instance of a certificate 154 held by the CMC 12, may have a signature 124 by a higher certifying authority 152.

A policy 130, 140 may limit the authorization of the holder identified by the ID 122, 132 and certified by the digital signature 124, 134. A policy 130, 140 may incorporate the limitations governing the use of algorithms in engines 20, for example. Thus, a policy 130, 140 may be thought of, for example, as the rules enforced by a manager module 18 controlling access to and from a module 13, such as an engine (e.g. cryptographic engine 50).

Each policy 164 (e.g. 164d, see FIG. 5) may contain a digital signature 163 (e.g. 163d) of the certifying authority 152 (e.g. 152b) above the holder 152 (e.g. 152d) of the certificate 154 (e.g. 154d) and policy 164 (e.g. 164d). The policy 164 (e.g. 164d) may thus be bound to the corresponding certificate 154 (e.g. 154d) by the digital signature 163d.

In one embodiment, policies 164 may be generated by a separate policy authority using a policy authority digital signature 129, 139 (see FIG. 4). A policy authority signature 129, 139 binding a policy 130, 140 to a certificate 118, 120 need not be different from a certificate authority signature 124, 134, but may be. This is analogous to the certification authorities 152 for certificates 154. Thus, the policies 164 may be provided and signed 166 by a certifying signature 163 binding the policy 164 to a corresponding certificate 154. Nevertheless, the policy 164 may be certified by a policy authority 129, 139 other than the certificate authority 152 creating the corresponding certificate 154.

Referring to FIGS. 4–6, the certificate 118 may include identification records 122. The identification records 122 may contain information recursively identifying the higher certifying authority (e.g. 152a, 152b), as well as the holder (CMC 12) certified. However, the signature 124 may be verified by using the public key of the higher authority 152. For example, the signature records 124 may comprise a signature of a signature root authority 152b or higher authority 152a certifying, which authority is known by the identification 133. The private key 128 may be thought of as a key by which the holder (e.g. the CMC 12) creates signatures 134 for certificates 120 associated with, for example the key generation module 42 of the base executable 14 (see FIG. 6).

The identification records 132 may typically identify the holder of the certificate 154 associated with the certificate 120. Although the signature 134 is associated with the certifying authority providing the certificate 120, and itself holding the certificate 118, identification records 133 may identify the certifying authority 152 (e.g. associated with the ID 122). The signature 134 may be used by entities or processes needing to verify the authorization of the holder (entity identified by the ID 132) of the certificate 120.

As a practical matter, a private key 128, 138 is typically not stored in the clear in any non-volatile storage generally available. That is, a private key 128, 138 may typically be unwrapped or loaded only dynamically to minimize the chance of any unauthorized access. The private key 128, 138 may optionally be stored within a cryptographic co-processor, for example an additional processor 70. The cryptographic co-processor may be embodied as a chip, a token, a PCMCIA card, a smart card, or the like. The private key 128 may be unwrapped in the co-processor for use only within the co-processor.

The applications 40 the pre-processor 93 and the channels 96 may be stored in the data structure 114. Nevertheless, the data structure 114 may be distributed.

The library modules 16, the manager modules 18, the engines 20, and the support modules 22 may be stored in the data structure 114. In one embodiment, the data structure 114 may all be resident in the RAM 72 in some dynamic fashion during operation of the operating system 14 functioning in the processor 70.

The certificate 120 may be embodied as illustrated in the frames 142. The identification record 132 may be thought of as a data segment 132 associated with a holder. The segment 133 may be provided to identify a certifying authority 152. Each public key 136, 126 may be represented as bits of a segment 136, 126 in the frame 142. The signature 134, 124 of a certifying authority 152 may be represented as another set of bits of a segment 134, 124 in the frame 142. The policy 140, 130 may be represented by another segment 140, 130. The certificates 118, 120 may have corresponding (e.g. even identical) policies 130, 140 under which to operate.

The public key 136, 126 is identified with the holder ID 132, 122. A public key 136, 126 is typically published to other functions or to other entities, just as a certification authority's 152a, 152b, 152c public key 160a, 160b, 160c is published. Thus, a certifying authority's public key 136, 126 is illustrated in FIG. 4 as being separate from the frame 142. The public key 136, 126 may be embedded in another certificate held by a certifying authority. Similarly, a holder's private key 138, 128 may be maintained with utmost security. Therefore, a holder's private key 138, 128 is not available with the holder's published public key 136, 126, except to the holder. Thus, a holder's private key 138, 128 may not actually be generally available or associated with the certificate 120, or certificate 118, respectively, in the frame 142.

Referring now to FIGS. 4–6, the certificate hierarchy is illustrated, as is the implementation of operational keys 156, 160. Reference numerals having trailing letters, may be thought of as specific examples of a generic structure or function associated with the reference numeral alone. Thus, a certifier or certification authority 152 is a general expression, whereas the root certifier 152a and the CMC signature root 152b are specific examples of a certification authority 152.

In general, an authority 152 (e.g., root certifier 152a), may issue a certificate 154 (e.g., 154b, 154c). A certificate 154 (e.g., 154b, 154c) may be associated with authorization of a certificate holder (e.g., 152b, 152c) by a certification authority 152 (or just authority 152). Associated with a certificate 154 may be certain data 120, 118. For example, in one embodiment, a certificate 154 may actually be embodied as a frame 142 as illustrated in FIG. 4.

In general, a certificate 154 (e.g., 154b) may be prepared by an authority 152 (e.g., 152a) using a private key 156 (e.g., 156a) held securely in the possession of the authority 152 (e.g., 152a). A certificate 154 (e.g., 154b), itself, may contain information such as the holder identification 158 identifying the holder to whom the authority 152 has issued the certificate 154. Note that the holder 152 (e.g., 152b) may itself be another authority 152 (e.g., 152b) to a lower level holder 152 (e.g., 152d).

The certificate 154 may also include the authority's 152 signature 162. By signature 162 is meant, a digital signature as known in the cryptographic art. Also included in the certificate 154, or linked by the signature 162 with the corresponding certificate 154, may be a policy 164. A policy 164 represents the extent of the authorization provided by the certificate 154, (154b) to the holder (e.g., 154d) of the certificate from the authority 152 (e.g., 152b) in order to produce cryptographic functionality.

For example, a holder 152d may have a certificate 154d and private key 156d authorizing the holder 152d to produce modules, such as cryptographic engines 20, manager modules 18, library modules 16, or symmetric or asymmetric keys 156. The policy 164d may embody the restrictions, limitations, and authorizations extended to the holder 152d of the certificate 154d.

In one embodiment, the enforcement of policies 164 may be managed in one or more of several, relatively sophisticated ways. For example, a policy 164 might permit a private key of a relatively long length, such as 1024 bits, to be used for digital signatures 162 only. On the other hand, a private key 156 used to wrap symmetric keys may be permitted to extend only to 768 bits, and only on condition that the key 156 be escrowed.

Also, rules for "composition" of policies 164 (certificated features or functions), or perhaps more descriptively, "superposition" of policies 164, may be embodied in manager modules 18. For example, more than a single policy may be loaded within a filler 12, for one of several reasons. For example, modules 13 from different vendors may be manufactured under different authorities 152. Also by way of example, as in FIG. 4, a policy authority digital signature 129, 139, certifying a respective policy 130, 140, need not be from the same source as a certificate authority digital signature 124, 134, but may be.

Meanwhile, a manager module 18 may be programmed to enforce the most restrictive intersection of all features (e.g., certificated features or functions such as quality, cryptographic strength, etc.). For example, one policy 164 (a certificated feature) may require that key-wrapping keys may be 1024 bits long and must be escrowed. Another policy 164 in another module 13 in the same filler 12 may require that keys be only 512 bits long, but need not be escrowed. The cryptographic manager module 18 may require a key length limit of 512 bits, and require escrow also. Thus a superposition of policies 164 may use the most restrictive intersection of policy limitations.

An authority 152, thus certifies 166 or provides a signing operation 166 for a certificate 154 for a holder. Referring to FIG. 5, the certification authority 152a (the root certifier 152a) is an authority 152, to the CMC signature root 152b as a holder, both with respect to the certificate 154b.

Each certificate 154, is signed using a private key 156 of a certifying authority 152. For example, the certifiers 152a, 152b, 152e use private keys 156a, 156b, 156e, respectively, to sign the certificates 154b and 154e delivered to the CMC signature root 152b and server CA 152e, and certificate 154j forwarded by the key generation module 42.

The certificate 154b also includes a public key 160b. A public key 160, in general, is one half of a key pair including a private key 156. For example, the private 156a, 156b, 156c, 156d, 156e, 156f, 156g, 156h is the matched half associated with the public 160a, 160b, 160c, 160d, 160e, 160f, 160g, 160h. The key pair 156a, 160a, is associated with the root certifier 152a. Similarly, the private key 156b may be used by the CMC signature root 152b to certify 166d, 166e the certificates 154d, 154e with the signatures 162d, 162e. Thus, in turn, each of the public keys 160d, 160e, respectively, is the public key half of the pair that includes the private key 156d, 156e, respectively.

A holder, such as the module signature authority 152d or the server certification authority 152e may verify the validity of the public key 160b using the signature 162b and the public key 160a. Similarly, a processor entity may verify the validity of the certificates 154d, 154e, respectively, by recourse to the signature 162d, 162e, respectively and the publicly available public key 160b responsible.

Referring to FIGS. 5 and 6, generation of private/public key pairs 156, 160 and subsequent certification 166 may be represented by cascading certificates 154. For example, at the top or root of all certification authorities 152 may be a root certifier 152a. The root certifier 152a may generate a private 156a, and a public key 160a, as a key pair 156, 160.

The root certifier 152a need have no signature 162. The root certifier 152a in such circumstance must be "trusted". Another method, other than a digital signature 162 of a higher certifying authority 152, may typically be required for verifying the public key 160a of the root certifier 152a.

Only one root certifier 152a (RC 152a) is needed for the entire world. In one embodiment, the root certifier 152a may be an entity willing and able to credibly assume liability for the integrity of public keys 160, and the integrity of associated certificates 154. For example, an insurer, or a company known and trusted by the entire business world, may serve as a root certifier 152a. Such companies may include large, multinational insurance companies and banks. The root certifier 152a is functionally responsible to physically protect the secret key 156a. The root certifier 152a is also responsible to distribute the public key 160a.

The root certifier 152a may authorize private/public key pairs 156b, 160b to be created by the CMC signature root 152b. The integrity of the public key 160b, and the identity 158b of the CMC signature root may be certified by a digital signature 162b created by the root certifier 152a using the private key 156a.

Any subsequent entity, receiving a certificate 154 cascading from the CMC signature root 152b as a certifying authority 152, may verify the certificate 154. For example, the certificate 154b, and its contents (public key 160b, ID 158b, and signature 162b) may be verified using the signature 162b. The signature 162b may be created using the private key 156a. Therefore, the signature 162b can be verified using the public key 160a available to the entity to whom the authority of a certificate 154b is asserted as authentication.

The root certifier 152a may have its public key 160a embedded in the base executable 14. Alternatively, any method making the public key 160a securely available may be used. In this example, the base executable 14 or principal software product 14 may typically, be an operating system 14. The base executable 14, operating system 14 or base executable 14 may be thought of as including everything that arrives in the base executable associated with a newly purchased, generic, software package 14. This may sometimes be referred to as "the base executable 14."

As a practical approach, the CMC signature root 152b may be associated with, and the private key 156b be in the possession of, the "manufacturer." For example the manufacturer of a base executable 14, such as a network operating system 14 may be the holder of the private key 156b used to certify all public keys 160d and associated certificates 154d of the module signature authority 152.

As a practical matter, the highest level of public key 160 embedded in (or otherwise securely available to) a base executable 14 may be the signature root key 160b associated with the certificate 154b. An instantiation of the certificate 154b may be embedded in, or otherwise securely available to, the CMC loader 90. Thus, the loader 90 may verify against the manufacturer's public key 160b (available to the loader) the signature 162d in the certificate 154d effectively presented by the module 13. That is, one may think of the certificate 154d as being included in the cryptographic module 13 (engine 20) of FIG. 6 by a module vendor.

Thus, the loader 90 may verify that a vendor is authorized to produce the modules 13 under the policy 164d bound to the certificate 154d. However, the foregoing starts at the wrong end of the process. The signature 168 on the module 13 is present for verification of the module by the loader 90. The signature 168, encrypted using the private key 156h, may be verified by recourse to (e.g. decryption using) the public key 160h. The key 160h is presented in the certificate 154h, also available with the module 13.

In turn, the signature 162h on the certificate 154h, may be verified using the public key 160d. The key 160d corresponds to the private key 156d used to encrypt the signature 162h. The key 160d is available in the certificate 154d with the module 13. The certificate 154d and key 160d are verified by the signature 162d on the certificate 154d with the module. The signature 162d may be verified (e.g. such as by decryption or other means) using the public key 160b of the CMC signature root 152b. An instantiation of this key 160b is available to the loader 90 with the certificate 154d, as discussed above. By having the certificate 154d independently of the modules 13, the loader may thus verify each module 13 before loading into the filler 12 (CMC 12).

As an example, the CMC signature root 152b may be associated with the manufacturer of the base executable 14. The base executable 14 may be thought of as the principal software product 14, such as an operating system 14. By contrast, the CMC 12 may be thought of as a filler 12, a modularized segment that is required to be present within the base executable 14, but which may be modified, customized, limited, authorized, or the like, by a manufacturer for a class of customers or by a suitably authorized, third-party vendor of modules.

In the case of a base executable 14 that serves as a network operating system 14, such as Novell Netware™, the manufacturer, (Novell, in this example) may be the CMC signature root 152b. Another example may be a third-party vendor of modules 13. A third party vendor of modules 13 may produce, for example, engine modules 20 for insertion into the CMC 12, but may be a value-added reseller of the base executable 14 adapted with such a cryptographic engine module 20 or other module 13.

For purposes of discussion, a manufacturer may be thought of as the maker of the base executable 14. A vendor or third party vendor may be thought of as the maker of modules 13 for inclusion in the CMC 12 (filler 12) portion of the base executable 14. A distributor, reseller, or third party reseller may be thought of as a seller of base executables 14 purchased from a manufacturer. The manufacturer may distribute and create modules 13. A vendor of modules 13 may be a distributor of the base executable 14, also.

Thus, a situation of great interest involves a manufacturer desiring to provide the base executable 14, while certifying a vendor's module products 13. The modules 13 may be integrated as part of the CMC 12 of the base executable 14 after the base executable 14 is shipped from the manufacturer. As discussed above, shipment of a base executable 14 in some standard configuration is desirable. In a preferred embodiment a base executable 14 shipped into a foreign country having import restrictions on cryptography, may provide a reliable method for enabling authorized cryptography exactly, while disabling all other potential uses of cryptography. Minimum modification, interfacing, and cost may be provided by an apparatus and method in accordance with the invention, with maximum assurance of authorization and control, all at a reasonable processing speed.

The CMC signature root 152b may be responsible for manufacturing and exporting the base executable 14 to customers (users) and third party resellers, and supporting software development kits (SDKs) to third party vendors. The manufacturer may be a maker of modules 13 also. Typically, the manufacturer may produce the null engine 48, at least.

The module signature authority 152d associated with the ID 158d may be that of the holder of a software development kit for modules 13. A policy 164d bound to the certificate 154d may be certified by the signature 162d of the CMC signature root's 152b private key 156b.

The policy 164d may be enforced by the manager module 42 and embodies the limits on the use and strength of keys 156d. For example, the length (strength) of keys 156 useable under the policy 164d and the types of modules 13 may be controlled by statute in each country of importation for the base executable 14.

A loader 90 from the manufacturer may control linking of modules 13. Thus, a third party, including a module vendor cannot change the limitations inherent in a key, the policy, or the like.

A policy 164, in general, may define the maximum strength of the key. A module signature authority 152d, holding a particular authorized software development kit may create different types of keys 156 as long as each is within the bounds of the policy 164d. The module signature authority 152d may also then certify a module-signing key pair 152h authority for each module type produced and sold. Certificate 154h, so signed using the private key 156d, may provide a key 156h to sign each module 13, such as the cryptographic modules 13 exemplified by the engine 20 of FIG. 4. Meanwhile a module signature authority 152d may certify embedded keys 160h and associated certificates 154h automatically by using the software development kit.

Note that a chain or cascade of certificates 154d, 154h may be used in a module in order to have the signatures 162 for the loader 90 to verify. The loader 90 may then verify the keys 160d, 160h using signatures 162d, 162h of the certificates 154d, 154h to authorize the loading of the module 20 (see FIG. 6).

Verification may be necessary in order for the loader to have the certified keys 160d, 160h, 160b necessary for verifying the module signature 168. That is, a vendor may use a software development kit containing a module signature authority 152d to create some number of module signing key pairs 152h.

The private keys 156h may be used to sign 166m with a signature 168 every module 13 created. Note that the modules 16, 10, 42 in the base executable 14 of FIG. 6 may all be thought of generically as modules 13 as in FIG. 1. The certificate hierarchy 154h, 154d, 154b of the module 13 may all be verified by the loader 90 using the appropriate public keys 160d, 160b, to verify the respective signatures 162h, 162d from the certificates 154h, 154d.

The server certifying authority 152e (CA 152e) may be produced by the manufacturer based on a CMC signature root 152. The server certificate authority 152e may be embodied in the server 60 (see FIGS. 2, 6) on a server-by-server basis. Thus, a server 60 may generate keys 156j or pairs as shown in FIG. 6. Thus, the server 60 is able to certify by a key generation manager 42 keys 160 generated by that server 60.

A private key 156 may preferably be unique to an individual server 60 so that there is no need to provide a globally exposed private key 156. The private key 156e of the server certificate authority 152e of FIG. 6 may be the only private key 156 embedded in a base executable 14 or operating system 14 hosted by a server 60. This may be very important for providing signatures 162j for certifying 166j other keys 160j and IDs 158j signatures 162.

As a practical matter, by embedding is meant alternate methods that may be implemented in the server 60 in another manner well adapted to dynamic loading. For example, the private key 156e may not necessarily need to be embedded, as in the illustrated example. Rather, the key 156e may simply be "securely available," such as by reading from a secure hardware device. Thus, a key 156e may be securely available to the CMC 12 in the server 60 and function as well as if actually embedded. The expression embedded should be interpreted broadly enough to include this "securely available" approach. This is particularly true since dynamic loading in combination with cryptographic techniques herein for verification make such methods readily tractable.

In general, a private key 156 may be used to produce certifying signatures 162. A key 156 may also be used to decrypt data received when it has been encrypted using a corresponding public key 160 to ensure privacy.

Both keys 156, 160 may be necessary for both privacy and integrity, but they are used at opposite ends of a communication. That is, for example, the CMC signature root 152b may use the public key 160 of the module signature authority to assure privacy of communication to the module signature authority 152d. The module signature authority 152d, may use the public key 160b of the CMC signature root 152b. Each 152b, 152d may use its own private key 156b, 156d to decrypt received messages. Integrity may be verified by a signature 162 authored using an appropriate private key 156b, 156d. Meanwhile, authenticity of communications, such as a signature 162d, created using a private key 156b, may be verified by an entity using the corresponding, published, public key 160b.

As a matter of good cryptographic practice, integrity and confidentiality (privacy) may rely on separate keys. A module 13 may employ a plurality of private/public key pairs 156/160. One pair may be used for channel confidentiality. A separate and distinct pair may be used for channel integrity.

The certificates 154 in the base executable 14, for example in the module 13, and loader 90 illustrate authentication of the cascade of certificates. Initially, the modules 13 of FIG. 6 are signed by the signature 168 created with the private key 156h.

The public key 160h may be used to verify the signature 168. References to decryption of signatures 168 mean verification, which requires some amount of decryption.

The authenticity of the public key 160h is assured by the signature 162h on the certificate 154h. The signature 162h is verified using the public key 160d in the certificate 154d available.

The authenticity of the public key 160d is assured by the signature 162d on the certificate 154d. The signature 162d is verified using the public key 160b in the certificate 154b available.

This illustrates the practical limit to authentication. The following is not separately illustrated in the architecture, but could be implemented. The authenticity of the public key 160b could be assured by the signature 162b by obtaining the certificate 154b. The signature 162b would have to be verified using the public key 160a in the certificate 154a available. Note that some other mechanism must be used to verify the certificate 154a.

A server may generate keys for cryptographic operations. For example, a separate set of keys 156j may exist for each client 58 on the network 56.

Asymmetric systems are more computationally expensive than symmetric systems. The key length used in asymmetric systems is typically much longer than that for symmetric systems. (e.g. asymmetric keys may be 1–2 k bits long, versus 40, 64, or 128 bits for typical symmetric keys). In cryptographic protection schemes, an asymmetric algorithm may be used to protect a symmetric key that will be distributed to a client 58 encrypted using the client's public key 160 and decrypted by the client's corresponding private key 156. A shared secret key may be used for shared symmetric key communication in a network 56. Thus, the server CA private key 156e may be used to generate a signature certifying other public/private key pairs 160, 156. That pair 156, 160 may be used to certify another pair or to distribute a symmetric key pair.

A certificate 154 is needed for a public key 160, and must be signed (162) using the corresponding private key 156. A private key 156, for example, is used to certify any public key 160 created in the key generation module 42 of FIG. 6. That is, the key generation module 42 may generate a key pair 156, 160; in which the server CA private key 156e is used to sign the certificate 154j created by the key generation module for the cryptographic libraries.

The server CA private key 156 may be used to sign all certificates 154 (with included public key 160) generated by the CMC filler 12 in the base executable 14 of operating system 14 hosted on the server 62.

A server key (not shown), which may be symmetric, may be generated by the key generation module 42 and used for key wrapping. All keys that should be kept secret may be wrapped for being transmitted or stored secretly outside of the CMC 12, such as in a cryptographic library 36.

Certain of the attributes of a key 156 (algorithm, archive, type, etc.) may be wrapped along with the key 156 before being passed outside of the CMC 12. Thus a private half of an asymmetric key pair, or a symmetric, secret key should be wrapped preceding any export or output from the CMC 12.

The libraries 16 may be (typically must be) application-specific, and anything transmitted to them may be considered to be outside of the control of the CMC 12 once it is transmitted to the library 16.

Escrow is controlled by a manager 18 such as the key generation manager 42, a cryptographic manager 18. In any case, every key 156j generated should be saved throughout its useful life. A key 156j may be saved, typically, in an encrypted format in a secure environment called a key archive 170. The archived key 156j may first be encrypted, and the key 160 to that encryption is the escrow public key 160k. The corresponding public key 160j is also archived, although it may be publicly available.

The escrow authority 152f may be an entity generating a public/private key pair 160, 156 for each server 60 in order to encrypt (privacy protect) private keys 156 before archival. Thus, the escrow authority 152f may have a private key 156f unique to itself, which is used to sign 162k the certificates 154k for all of those public/private key pairs 156k, 160k. The escrow authority 152f may receive its private/public key pair 156f, 160f from a key escrow root 152c. The key escrow root key 156c may certify the key 160f held by the escrow authority 152f. The manufacturer of the base executable 14, (Novell, in the example above, may be (i.e. control) the key escrow root 152c.

The certificate 154c held by the key escrow root 152c may itself be signed by the root certifier 152a certifying the public key pair 160c of the key escrow root 152c. Thus, the key escrow path (certifications 166, cascade) of certificates 154 and keys 156, 160 may have its source in the root certifier 152a, just as the CMC signature root 152b does. Thus this single root public key 160 can serve as the basis for validation of all other certificates.

An escrow authority 152f may hold the private key 156k to the archive holding the encrypted, escrowed keys 156. The archive 170 may actually be inside the server 60. Thus, the holder of the base executable 14 has all the encrypted keys 156.

However, a government or some such agency may require certain keys of the escrow authority 152f. A manufacturer, such as Novell, the operating system manufacturer, in the example above, could also serve this function as well as being the key escrow root 152c. This may be advantageous for the same reasons that a manufacturer would be the signature root 152b. The escrow authority 152f may give to the agent the escrow private key 156k for the specific server. This may be the private half 156k of an escrow key 156 that the keys 156 in question were encrypted in for archiving. The government may then go to the user of the server 60 to get access to the archive 170 in the server 60 of the owner of all the keys 156j.

Some governments may want to be the escrow authority 152f for all escrow keys. The government may unlock the key archive 170 whenever desired. In certain countries, the key archive 170 may be in possession of a trusted third party or the government. For example, the key generation module 42 may need to create keys 156j, encrypt them, and send them as data to a trusted third party acting for the government to control the archive 170.

From the above discussion, it will be appreciated that the present invention provides controlled modular cryptography in an executable designed to be embedded within another executable such as a network operating system, or the like.

Cryptographic capability is controlled by a manager module operating according to a policy limiting the capability and access of other modules, particularly that of the cryptographic engine. Thus, a system 14 (a base executable 14) may be provided having nearly all of the capabilities of the "filler" 12 intact. A very limited interface between a filler 12 and its internal engine selection 20 provides for examination of engines 20 by regulatory authority. Moreover, the restricted interfaces 30, 32 between the engines 20 and the remaining modules 13 of the filler 12 present great difficulty to those who would modify, circumvent, or replace any portion of the filler 12 (CMC 12) in an attempt to alter its capabilities. Meanwhile, asymmetric key technology provides for enforcement of all controls, thus providing privacy and integrity for all communications, operations, exchanging of keys, and the like.

Flexible Escrow

Figure 7:
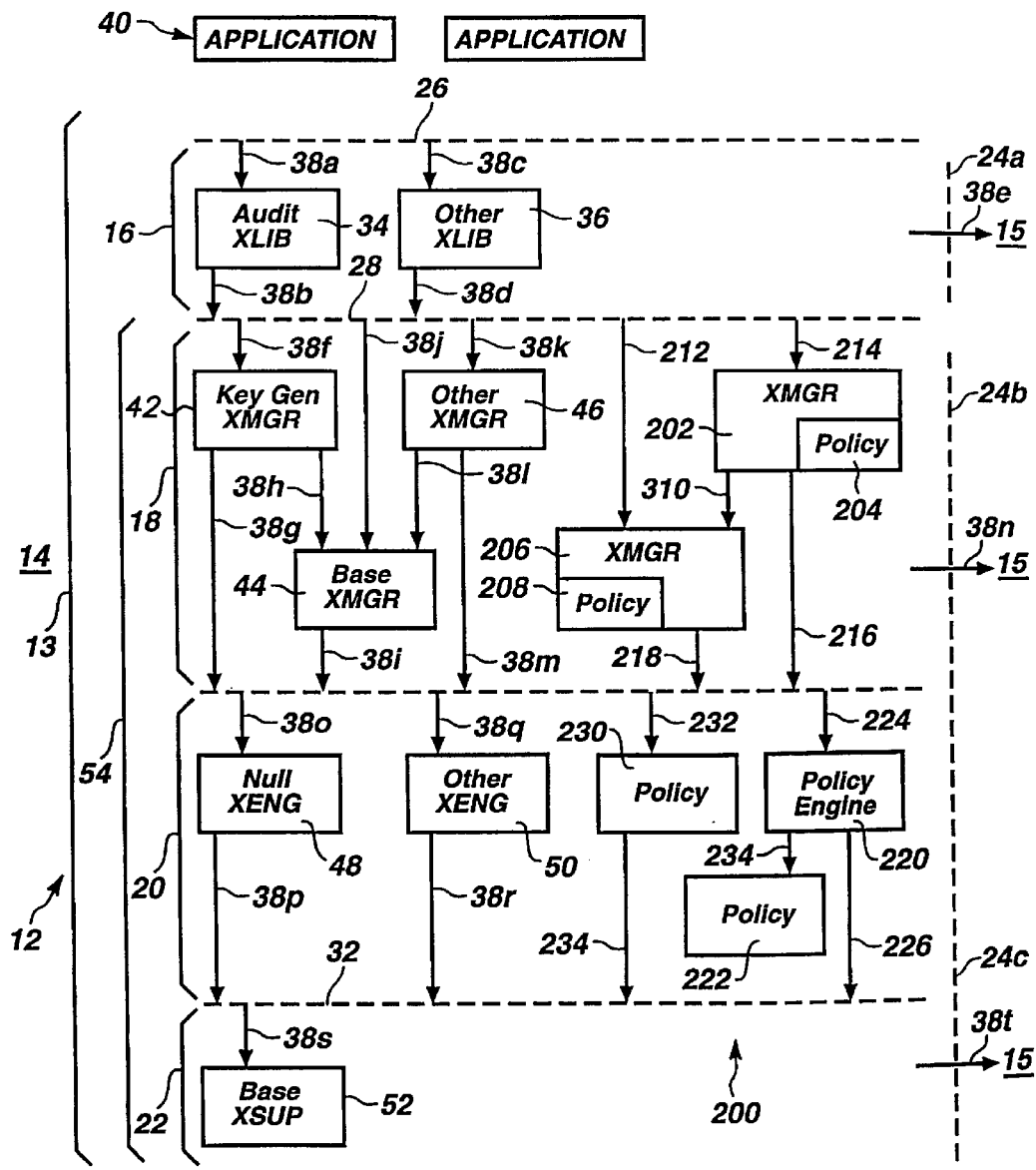
FIG. 7 is a schematic block diagram of modules arranged in an alternative embodiment of an architecture of the present invention.

Referring to FIG. 2, a system 10 in accordance with the invention may include a flexible policy apparatus 200 (FIG. 7) implementing selected modules 13. In one embodiment, a manager module 202 (FIG. 7) may contain an embedded policy 204 (FIG. 7). A policy 204 (FIG. 7) may correspond to a key usage policy, key generation policy, escrow, escrow policy engine, filter policy, filter policy engine, certification policy, or the like.

In one presently preferred embodiment, the policy 204 (FIG. 7) may be located remote from the layer 18 in which the manager modules 42, 44, 46 are associated with, and be associated with, and be associated instead within the layer 20. In further embodiment, other manager modules 206 (FIG. 7) may also be present. The manager modules 202, 206 (FIG. 7) may each communicate directly with the library layer 16. The manager modules 202, 206 (FIG. 7) may also communicated with or through other manager modules of FIG. 7. Thus for instance, while the manager module 206 (FIG. 7) may rely upon a policy 208 (FIG. 7), it is not necessary that one policy 208 (FIG. 7) be integrally embedded within the manager module 206 (FIG. 7).

Referring now to FIG. 7, the manager module 206 may communicate 310 with the manager module 202 and may communicated 212 also or alternatively communicate with the library layer 16 In one embodiment, the manager module 202 communicates 214 directly with the library layer 16 while in another embodiment, the manager 206 communicates with the library layer 16 only through the manager 202 in the manager layer 18. This arrangement may remove the need for an embedded policy 204 governing the manager module 202.

In an embodiment of the invention, a policy engine 220 is located within the engine layer 20 and includes executables and data for establishing control attributes relied upon by modules 13 in the management layer 18. For example, a policy engine 220 may create or rely upon a policy 222. A call 224 may communicate 224 between the manager layer 18 and the policy engine 220. Alternatively, calls 224, 226, may be directed between modules 13 in the engine layer 20 and modules 13 in the manager layer 18, as well as modules 13 within the support layer 22. However, modules 13 within the engine layer 20 may also communicate with one another.

In one embodiment, a policy 230 may include no executables, and merely contain data relied upon and processed by a manager module 42, 44, 46, 202, 206, or the like. Calls 232, 234 may directly communicate with or operate upon the policy 230, rather than to passing through or relying upon any engine 220 in the engine layer 20. Thus, an XMGR 202, 206 may be relied upon by a module 13 in the management layer 18 to implement a policy 230. Policies 230 may be linked to other policies 222. Moreover, executables within a policy engine 220 may be used to create, verify, sign, reconcile, and otherwise modify the attributes of various policies 222, 230. The policies 230 as with the other modules 13, may be dynamically linked and authenticated independent of the others of the modules 13. This minimizes the amount of code in any one module for efficiency and reduced exposure. It also increases flexibility of the policies 230 or other modules 13 may be modified independent of the other modules and the entire CMC 12.

Figure 8:
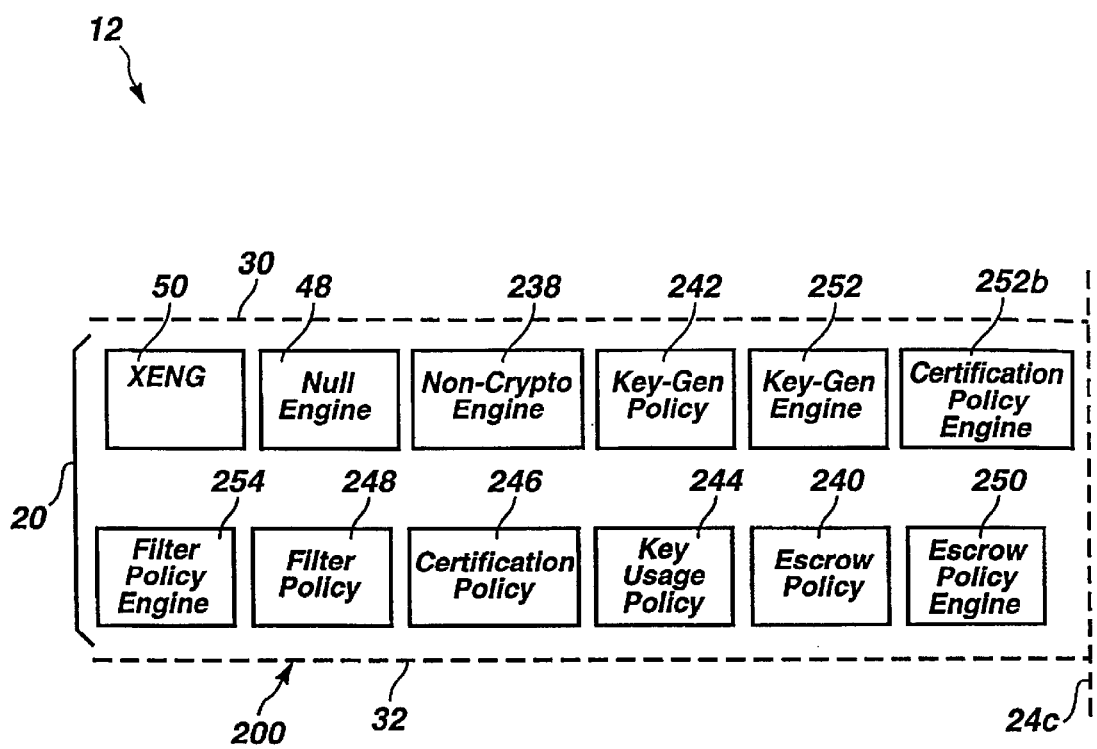
FIG. 8, is a schematic block diagram illustrated in greater detail an engine layer of the architecture of FIG. 7.

Referring to FIG. 8, various types of modules 13 (of FIG. 1) in the engine layer 20 are illustrated. The modules 13 in the engine layer 20 are typically engines and are not displayed in any particular order to illustrate that the engines are independent modules 13 and need not be linked or otherwise related to each other. For example, a null engine 48 may be provided to operate in the absence or non-intentional non-use of a cryptographic engine 50. A non-cryptographic engine 238 may also be provided, the non-cryptographic engine 238 may provide specific functionality other than cryptography or merely maintaining links. For example an individual, or organization may not need or desire cryptographic capability. Nevertheless, certain filtering and watchdog functions over incoming and outgoing communications may be desirable. Accordingly, policies 230 (of FIG. 7) my be put in place that have no cryptographic capacity or reliance.

An escrow policy 240 may also be implemented as a separate module 13 and located at a lower layer such as in the engine layer 20 in subjugation to the manager layer 18 is an escrow policy 240. Escrow policies, as discussed above, may be implemented independent from an individual manager 202, 206. Nevertheless, a manager module 42, 44, 46, 202, 206 may be responsible for controlling, establishing, enforcing, and the like, an escrow policy 240. Escrow policies 240 may control a substantial number of variables affecting accessibility to cryptographic features.

A key generation policy 242 may be implemented in the engine layer 20, as may a key usage policy 244. In certain embodiments, a key generation policy 242 may be relied upon by a key generation manager 42 in determining when, how, and to whom keys may be provided.

As a practical matter, a certification policy 246 may be extremely useful in an apparatus 10 in accordance with the invention. In certain embodiments, certificates 154 may be defined, provided with controlling data, and the like, in accordance with a certification policy 246 that may be loaded into the engine layer 20.

In an apparatus 10 in accordance with the invention, dismemberment of conventional functionalities into individual modules 13 dynamically linked by a loader 90 may be extremely helpful. For example, a filter policy 248 may be thought of as a policy 248 adapted to use no cryptography, but to provide a similar service with respect to non-cryptographic functionality. Accordingly, the filter policy 248 may be generalized for use and may be thought of as an abstraction for any policy 230.

An escrow policy engine 250 may be provided for containing executables associated with an escrow policy 240. The escrow policy engine 250 may contain all the data that an escrow policy 240 would contain. Nevertheless, an escrow policy engine 250 may contain exclusively executables. On the other hand, any amount of executable and operational data structures may be implemented in an escrow policy engine 250. As a practical matter, an escrow policy engine 250 may be a software object 250.

An apparatus 10 may be dynamically linked together as a variety of components 16, 18, 20, 22, separated from one another by cryptographically-imposed barriers 28, 30, 32. Similarly, a key generation engine 252 may be located within the engine layer 20. As a practical matter, a key generation engine may be embedded in a manager module 202, 206. Nevertheless, flexibility of key generation capacity may be more easily achieved using the general purpose cryptographically-implemented apparatus 10 developed to provide an infrastructure as illustrated. The apparatus 10 is thus effective to implement such various policies 242, 244, 246, 248, and other modules 13 with extreme flexibility, yet strict controls.

In general, a filter policy engine 254 may be thought of as an object or other combination of executables with related data structures. In one embodiment, a filter policy engine 254 may be used to make traffic decision regarding incoming or outgoing features, data, capacities, entities, and the like.

The flexibility provisions of the present invention may extend beyond merely modularizing and subjugating the policies 222, 230 and policy engines 220. Thus, for example, other individual modules 13 might be contained within any policy and be modularized, nested, dynamically linked, and cryptographically controlled.

Figure 9:
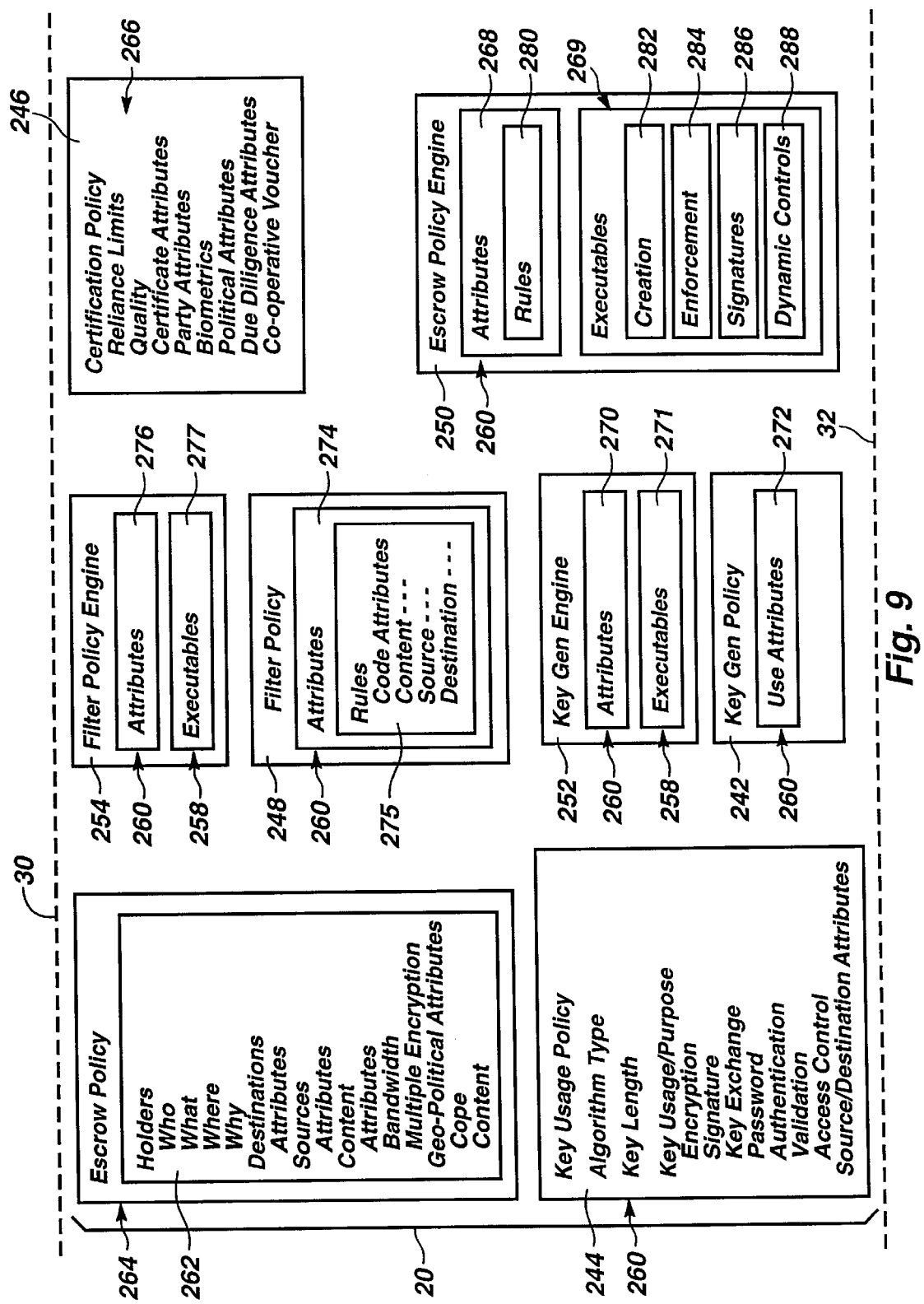
FIG. 9 is a schematic block diagram illustrating in greater detail modules within the engine layer of FIG. 8.

Referring to FIG. 9, shown therein are possible modules 13 for inclusion within an engine layer 20 or other layer subjugated to a manager layer 18, together with exemplary contents of those modules 13. For instance, the attributes 260 may be modularized and contain the particulars of a policy 230. A policy 230 may also contain modularized executables 258 relying on attributes 260 within the policy engine 220. Alternatively, a policy engine 220 may provide executables 258 effective to interact with, create, abide by, enforce, and the like certain policies 230 under the direction of a module 13 in the management layer 18.

Particular attributes 260 for one embodiment of an escrow policy 240 are illustrated in FIG. 9 these may include contents, and geopolitical considerations for particular holders of keys 156 and certificates 154, as well as destinations, sources, keys 156 and certificates 154. These attributes might also be separately modularized and optionally governed by a manager module 18.

Particular attributes 262 regarding holders of keys 156 and certificates 154 (privileges) might include particulars pertaining to who may hold the privileges 154, 156; what form the privileges 154, 156 may be in; where the privileges 154, 156 may be used and for what purposes.

Source information or destination information as attributes to effect of affect cryptographic features available from the apparatus 10. Attributes 262 associated with content may include frequencies of transmission, band width, and the like that may provide covert channels for communication. For example, a file that is sufficiently large and dense may be modulated ever-so slightly to provide a valuable but covert channel. Consequently, formats, carrier signals and the like may be governed by a policy 230, 240.

Geo-political attributes, might govern the use of certain cryptographic engines 50, e.g. in countries with legal restrictions on such engines 50. Additionally, escrow requirements also very among differing countries.

In another embodiment, multiple encryption may be forbidden to certain entities in accordance with a policy 240. As a practical matter, the escrow policy 240 is preferably effective to instruct a module 13 in the management layer 18 how to provide escrow functionality in accordance with laws and regulations effecting an entity using the apparatus 10.

Referring to FIG. 9, illustrated attributes 260 for one embodiment of a key usage policy 244 may include algorithm-types, key lengths, and key usages and purposes available. The particular attributes 260 of the key usage policy 244 may include limitations on usage for encryptions, signatures, key exchange, key words, pass words, certain authentications, validation, access control, and the like. Of course the key usage policy 244 may require a variety of other types of attributes 260 to be associated with keys 156.

The certificates 154 may be defined, controlled, evaluated, implemented, and the like in accordance with certification policy attributes 266, which may be associated within a certification policy 246. Examples of particular attributes 266 of a certification policy include financial reliance limits, and quality standards. Thus, trusted systems evaluation class, and other measures of reliability may be implemented at will within certification policies 266 by implementing the methods and apparatus in accordance with the invention.

Certification policy attributes may also include certificate attributes deemed useful and pertinent in evaluating the reliability of a certificate 154. Party attributes, might include characteristics of parties engaging in a communication or transaction and other certification policy attributes 266 might be defined in virtually any detail from geographical, political, financial, or even by biometric considerations. Biometric considerations may include thumb prints, or other physically identifying characteristics that can be used to form a rational basis for a certification policy 246.

One immediate concern is political attributes throughout the world. Terrorists in one country may be responsible for instabilities causing entities from other countries to limit cryptographic capabilities sent thereto, received therefrom, or implemented in any way at that location. In certain environments, a degree of diligence must be exercised in evaluating trustworthiness of an organization.

Certification policy attributes may include any or every consideration from personal integrity, financial status, physical plant, sensitivity of information, and the like that may be evaluated in determining the trustworthiness or other reliability factors of certificates to be provided to or provided by such an entity. Likewise, as a co-signer on a loan, an individual who operates as a cooperative voucher for another may be identified as a particular attribute 266 in a certification policy 246.

The number of attributes 260 that may be used in the CMC 12 of the invention is effectively limitless. As infrastructure is developed, new individual attributes 260 and executables 258 may be added under the modularized scheme of the present invention used to implement a host of policies 230 and policy engines 220. Under this scheme, a high degree of integration need not be required or even desired at the manager level 18 or through the entire modules 13.

A certification policy engine 252b may also be present. Likewise, any characteristics of others of the attributes 260 that are to be implemented in a policy 230 may also be defined implemented, and enforced by a policy engine 220 typically under the direction of a manager 42, 44, 46.

An escrow policy engine 250 is illustrated by the way of example in FIG. 9 and may include modularized attributes, as well as modularized executables 269. As a practical matter, all attributes 268 may be thought of as defining characteristics of entities that would be governed by policies 240, 242, 244, 246, 248. Accordingly, executables 269 may merely control, enforce, or provide other operations necessary to implement rules 280. The executables 269 and a policy engine 250 may obviate the need for a module 13 in the management layer 18 to be pre-programmed in order to implement rules 280 in attributes 268 in a policy 230, 250.

A key generation engine 252 is also shown by way of example in FIG. 9 and may include attributes 270 and executables 271, as with the other engines 220. Similarly, the dichotomy between the engine 220 and the policy 230 may be implemented in a separate key generation engine 252, and key generation policy 242. Thus, the attributes 270 may be exported as use attributes 272 of a key generation policy 242.

The separation of the modules 13 in the management layer 18 and the policies 220, 230 may be further extended to a separation of any or all of the engines 252 from any policies 242 that the engine 252 may create under the direction of the management layer 18.

A filter policy engine 254, shown in FIG. 9 by way of example, may be thought of as a generalized engine 220. As a matter of utility, a filter policy engine 254 may use attributes 276 and executables 277 to implement any type of a filter. The attributes 276 and executables 277 may also be modularized in certain embodiments, the region of origin of code or content, may be limited. Regionality may be defined geographically, by spectrum position, by transmission frequency, and the like. Moreover, the region of origin and destination of content of messages may be controlled. For many years, the Internet and the broadcast media have wrestled with the difficulties of implementing proper controls at individual sites of received broadcasts.

The age, gender, or any other attribute 276 may be used to determine a suitable manner for filtering by a filter policy engine 254 or management engine 46 implementing a filter. Thus, the attributes 274 of a filter policy engine 254 may be a subset of the attributes 276, may be created by the executables 277 in leu of the attributes 276, or may have some other relationship to the filter policy engine 254. In general, filter policy attributes 274 may include rules as to code, content, source, destination, and the like desired.

An escrow policy engine 250 is shown by way of example in FIG. 9 and may include therein rules 280 or attributes 268. Similarly, executables 269 may be contained therein and may include creation 282, enforcement 284, signing 286, and dynamically controls 288 of an escrow policy 240. As can be seen from the above discussion, a general purpose infrastructure implemented in the apparatus of FIGS. 1–9 utilizes dynamic linking and control of modules 13 to allow management modules 18 to access policy engines 220 or policies 230 without the need for integrating the policy engines 220 or the policy 230 therein. Accordingly, the policy engine 220 or policies 230 may themselves be independently dynamically linked within the CMC 12 of the present invention. The ability to flexibly escrow or establish other policies 230, including key generation, key usage, escrow of keys, and all of the implementation schemes associated therewith, may thus be implemented in a flexible, yet secure manner with the infrastructure of an apparatus 10 in accordance with the invention.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus, implemented in a computer-readable medium, having modules for executing controlled modular cryptography in a processor of a computer, the apparatus comprising:

a base executable programmed to be executable on the processor, the base executable manufactured under the control of a trusted authority and comprising a loader module for dynamically linking one or more modules with the base executable to operate as an integrated portion of the base executable;

a third party vendor engine module dynamically linkable with the base executable to be executable on the processor to operate selected cryptographic executables for an application operably associated with the computer; and the loader which utilizes a verification mechanism to verify that the engine module's use of cryptographic capability is within a predetermined scope.

2. The apparatus of claim 1, wherein the verification mechanism comprises a hierarchal chain of certificates.

3. The apparatus of claim 2, wherein the chain of certificates contains a policy and a unique property verifiable by the base executable, the policy determining the scope of cryptographic capability that may be provided to an application by the engine and verifiable by the unique property.

4. The apparatus of claim 3, wherein the third party vendor engine module comprises a certificate lower in a hierarchy than a certificate of the base executable.

5. The apparatus of claim 1, wherein the verification mechanism comprises a policy associated with the engine module.

6. The apparatus of claim 5, wherein the policy is modular and capable of linking by the loader separate from the third party vendor engine module.

7. The apparatus of claim 1, wherein the verification mechanism comprises a manager module associated with the base executable.

8. The apparatus of claim 7, further comprising a limited interface between the base executable and the third party cryptographic engine module such that the third party cryptographic engine must communicate with the base executable through the manager module, but so that government authorities are provided access to the third party cryptographic engine module through the base executable.

9. The apparatus of claim 1, wherein the verifying mechanism comprises a plurality of certificates, each certificate comprising a policy of differing scope, and wherein the verifying mechanism enforces the policy of the most restrictive scope.

10. The apparatus of claim 1, wherein the third party vendor engine module holds a certificate signed with the trusted authority private key.

11. The apparatus of claim 1, wherein the third party vendor engine module holds a certificate containing the certifying authority public key and wherein thee verifying authority comprises asymmetric key technology.

12. The apparatus of claim 1, further comprising a software development kit distributed to a third party vendor by the trusted authority, the software development kit comprising a certificate and a policy, and wherein the verifying mechanism comprises the certificate and policy.

13. An apparatus, implemented in a computer-readable medium, having modules for executing controlled modular cryptography in a processor of a computer, the apparatus comprising:

- a base executable programmed to be executable on the processor, the base executable manufactured under the control of a trusted authority and comprising a loader module for dynamically linking one or more modules with the base executable to operate as an integrated portion of the base executable;
- a third party vendor engine module dynamically linkable with the base executable to be executable on the processor to operate selected cryptographic executables for an application operably associated with the computer; and
- the loader which utilizes a hierarchal chain of certificates to verify that the engine module s use of cryptographic capability is within a predetermined scope.

14. An apparatus, implemented in a computer-readable medium, having modules for executing controlled modular cryptography in a processor of a computer, the apparatus comprising:

- a base executable programmed to be executable on the processor, the base executable manufactured under the control of a trusted authority and comprising a loader module for dynamically linking one or more modules with the base executable to operate as an integrated portion of the base executable;
- a third party vendor engine module dynamically linkable with the base executable to be executable on the processor to operate selected cryptographic executables for an application operably associated with the computer; and
- the loader which utilizes a policy to verify that the engine module's use of cryptographic capability is within a predetermined scope.

\* \* \* \* \*

UNITED STATES PATENT AND TRADEMARK OFFICE
CERTIFICATE OF CORRECTION

PATENT NO. : 6,751,735 B1
DATED : June 15, 2004
INVENTOR(S) : Schell et al.

It is certified that error appears in the above-identified patent and that said Letters Patent is hereby corrected as shown below:

<u>Column 31,</u>
Line 17, delete "module s" and insert -- module's --, therefor.

Signed and Sealed this

Twenty-fourth Day of August, 2004

JON W. DUDAS
*Director of the United States Patent and Trademark Office*